United States Patent
Mohamad et al.

(10) Patent No.: US 10,153,864 B2
(45) Date of Patent: Dec. 11, 2018

(54) METHOD FOR DYNAMIC AND SELECTIVE FD-DSDF TRANSMISSION OF A DIGITAL SIGNAL FOR A MAMRC SYSTEM WITH SEVERAL FULL-DUPLEX RELAYS, AND CORRESPONDING PROGRAM PRODUCT AND RELAY DEVICE

(71) Applicant: Orange, Paris (FR)

(72) Inventors: Abdulaziz Mohamad, Fontenay aux Roses (FR); Raphaël Visoz, Vanves (FR); Antoine Berthet, Chatenay Malabry (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/321,706

(22) PCT Filed: Jun. 25, 2015

(86) PCT No.: PCT/FR2015/051729
§ 371 (c)(1),
(2) Date: Dec. 22, 2016

(87) PCT Pub. No.: WO2015/197991
PCT Pub. Date: Dec. 30, 2015

(65) Prior Publication Data
US 2017/0155472 A1   Jun. 1, 2017

(30) Foreign Application Priority Data
Jun. 27, 2014 (FR) .................. 14 56103

(51) Int. Cl.
*H04B 7/14* (2006.01)
*H04J 1/10* (2006.01)
(Continued)

(52) U.S. Cl.
CPC ....... *H04L 1/0041* (2013.01); *H04B 7/15592* (2013.01); *H04L 1/0071* (2013.01); *H04L 2001/0097* (2013.01)

(58) Field of Classification Search
CPC ....... H04L 25/242; H04L 7/027; H04L 25/24; H04L 25/03343; H04L 25/497;
(Continued)

(56) References Cited

U.S. PATENT DOCUMENTS 5,663,957 A * 9/1997 Dent .................. H04B 7/18532
370/347
5,889,821 A * 3/1999 Arnstein ................ H03G 3/345
342/358
(Continued)

FOREIGN PATENT DOCUMENTS

WO WO 2011/033237  3/2011
WO WO 2012/022905  2/2012
(Continued)

OTHER PUBLICATIONS

English Translation of Written Opinion dated Dec. 27, 2016 for International Application No. PCT/FR2015/051729, filed Jun. 25, 2015.
(Continued)

*Primary Examiner* — James M Perez
(74) *Attorney, Agent, or Firm* — Knobbe, Martens, Olson & Bear, LLP

(57) ABSTRACT

A relay for a telecommunications system comprises a decoder which responds to received blocks corresponding to successive code words $x_{S,t}$ transmitted simultaneously by sources during T time slots. At each slot t, t=1, ..., T, a code word $x_{S,t}$ comprises B blocks $x_{S,t}^{(1)}, x_{S,t}^{(2)}, \ldots, x_{S,t}^{(B)}$. The first can be decoded independently of the other blocks, to estimate for each source code words $x_{S,t}$. It also comprises
(Continued)

a detector which detects messages that have been decoded without error and takes a decision and an encoder and transmitter which encodes a signal and transmits it to the destination, which signal is representative only of messages that have been decoded without error. When estimating, the decoder takes account of a signal transmitted by another relay representative of messages from the sources that were decoded without error by that relay. The encoder and transmitter is under the control of the detector in accordance with a selection scheme, after each received block.

15 Claims, 23 Drawing Sheets

(51) Int. Cl.
  *H04J 3/08* (2006.01)
  *H04L 1/00* (2006.01)
  *H04B 7/155* (2006.01)

(58) Field of Classification Search
  CPC . H04L 25/03057; H04L 1/06; H04L 27/2647; H04B 7/17; H04B 3/32; H04B 3/23; H04B 7/0845; H04B 7/0854; H04B 7/0857; H04Q 1/36
  USPC .................. 375/211–215, 259–285, 316–352
  See application file for complete search history.

(56) References Cited

U.S. PATENT DOCUMENTS

| | | | | |
|---|---|---|---|---|
| 6,975,582 | B1* | 12/2005 | Karabinis | H04B 7/18563 370/204 |
| 7,281,192 | B2* | 10/2007 | Shen | H03M 13/1137 375/322 |
| 8,116,400 | B2* | 2/2012 | Limberg | H04N 21/4382 375/270 |
| 8,155,049 | B2* | 4/2012 | Mow | H04B 7/026 370/252 |
| 9,164,816 | B2* | 10/2015 | Auvray | G06F 9/541 |
| 9,197,480 | B2* | 11/2015 | Boucadair | H04L 29/06 |
| 9,225,752 | B2* | 12/2015 | Boucadair | H04L 65/1069 |
| 9,312,986 | B2* | 4/2016 | Hatefi | H04L 1/0076 |
| 9,319,187 | B2* | 4/2016 | Hatefi | H04L 1/244 |
| 9,386,502 | B2* | 7/2016 | Reynaud | H04W 40/16 |
| 9,572,038 | B2* | 2/2017 | Khandani | H04W 16/14 |
| 9,634,797 | B2* | 4/2017 | Benammar | H04L 5/0023 |
| 9,882,626 | B2* | 1/2018 | Benammar | H04L 1/0076 |
| 9,997,830 | B2* | 6/2018 | Khandani | H01Q 3/46 |
| 2009/0175214 | A1* | 7/2009 | Sfar | H04B 7/15592 370/315 |
| 2012/0076243 | A1* | 3/2012 | Gresset | H04B 7/155 375/320 |
| 2013/0022088 | A1* | 1/2013 | Hatefi | H04L 1/004 375/211 |
| 2013/0034044 | A1* | 2/2013 | Hatefi | H03M 13/3746 370/315 |
| 2013/0223294 | A1* | 8/2013 | Karjalainen | H04L 5/14 370/277 |
| 2013/0250776 | A1* | 9/2013 | Hatefi | H04B 7/15521 370/243 |
| 2014/0056334 | A1* | 2/2014 | Khina | H04L 25/0204 375/211 |
| 2014/0093017 | A1* | 4/2014 | Osseiran | H04L 1/0052 375/341 |
| 2014/0133367 | A1* | 5/2014 | Chen | H04L 5/16 370/279 |
| 2015/0067454 | A1* | 3/2015 | Benammar | H04L 5/0023 714/807 |
| 2015/0124694 | A1* | 5/2015 | Benammar | H04B 7/15528 370/315 |
| 2016/0269202 | A1* | 9/2016 | Hsu | H05K 999/99 |
| 2016/0337075 | A1* | 11/2016 | Mohamad | H04B 7/15521 |
| 2016/0359581 | A1* | 12/2016 | Mohamad | H04L 1/005 |
| 2017/0141879 | A1* | 5/2017 | Mohamad | H04L 1/0076 |
| 2017/0155472 | A1* | 6/2017 | Mohamad | H04L 1/0041 |
| 2017/0163403 | A1* | 6/2017 | Karjalainen | H04L 5/14 |
| 2017/0331584 | A1* | 11/2017 | Visoz | H04L 1/004 |

FOREIGN PATENT DOCUMENTS

| | | |
|---|---|---|
| WO | WO 2013/093359 A1 | 7/2013 |
| WO | WO 2015/197990 A1 | 12/2015 |

OTHER PUBLICATIONS

Kschischang et al., "Factor graphs and the sum-product algorithm", Prepublication Avail. Online Jul. 27, 1998—76 pages.
Kschischang et al., "Factor graphs and the sum-product algorithm", IEEE Trans Inform Theory., (2001) IT-47(2): 498-519.
U.S. Specification and Abstract (English Translation) as filed in U.S. Appl. No. 15/321,712 dated Dec. 22, 2016 (33 pages).
U.S. Preliminary Amendment as filed in U.S. Appl. No. 15/321,712 dated Dec. 22, 2016 (10 pages).
Agustin et al. 2009. ICT-215282 STP Rocket. Retrieved from the Internet on Nov. 16, 2011: URL:http://www.ict-rocket.eu/documents/Deliverables/ROCKET/3D1UPCi.pdf, 194 pages.
Dubois-Ferrière et al. Jan. 1, 2005. Packet Combining in Sensor Networks. *Proceedings of the 3rd International Conference on Embedded Networked Sensor Systems*, SenSys '05, 14 pages.
Hatefi et al. Jul. 25, 2011. Full Diversity Distributed Coding for the Multiple Access Half-Duplex Relay Channel. *2011 International Symposium on Network Coding (NETCOD)*, 6 pages.
Hu et al. Sep. 1, 2007. Low Density Parity Check Codes Over Wireless Relay Channels. *IEEE Transactions on Wireless Communications*, 6(9):3384-3394.
Kramer et al. 2005, Cooperative Strategies and Capacity Theorems for Relay Networks. *IEEE Transactions on Information Theory, IEEE Press*, 51(9):3037-3063.
Plainchault et al. Dec. 5, 2011. Interference Relay Channel with Precoded Dynamic Decode and Forward Protocols. *Global Telecommunications Conference (GLOBECOM 2011)*, IEEE, 6 pages.
International Search Report and Written Opinion dated Oct. 13, 2015 for International Application No. PCT/FR2015/051729 filed Jun. 25, 2015, 13 pages.
French Search Report dated Mar. 25, 2015 for French Application No. FR 1456103 filed Jun. 27, 2014, 11 pages.
International Search Report dated Oct. 12, 2015 for International Application No. PCT/FR2015/051728 filed Jun. 25, 2015, 9 pages.
Written Opinion dated Oct. 12, 2015 for International Application No. PCT/FR2015/051728 filed Jun. 25, 2015, 8 pages.
French Search Report dated Mar. 27, 2015 for French Application No. FR 1456104 filed Jun. 27, 2014, 12 pages.
English Translation of International Application No. PCT/FR2015/051728 filed Jun. 25, 2015 (published on Dec. 30, 2015 as WO 2015/197990 A1), 33 pages.

* cited by examiner

| FIG. 7-1 | FIG. 7-3 |
|---|---|
| FIG. 7-2 | FIG. 7-4 |
|  | FIG. 7-5 |
|  | FIG. 7-6 |

FIG. 7

METHOD FOR DYNAMIC AND SELECTIVE FD-DSDF TRANSMISSION OF A DIGITAL SIGNAL FOR A MAMRC SYSTEM WITH SEVERAL FULL-DUPLEX RELAYS, AND CORRESPONDING PROGRAM PRODUCT AND RELAY DEVICE

RELATED APPLICATIONS

This application is the U.S. National Phase of Application No. PCT/FR2015/051729 entitled "METHOD FOR DYNAMIC AND SELECTIVE FD-DSDF TRANSMISSION OF A DIGITAL SIGNAL FOR A MAMRC SYSTEM WITH SEVERAL FULL-DUPLEX RELAYS, AND CORRESPONDING PROGRAM PRODUCT AND RELAY DEVICE" filed Jun. 25, 2015, which designated the United States, and which claims the benefit of French Application No. 1456103 filed Jun. 27, 2014.

FIELD OF THE INVENTION

In general manner, the present invention relates to the field of digital communications. More precisely, the field of the invention is that of transmitting coded data in a multiple-access multiple relay channel (MAMRC) network. A MAMRC network is a telecommunications system that, for a given destination, comprises at least four nodes: at least two transmitters and two relays. More precisely, the invention relates to relaying and it seeks to improve the quality of data transmission, and in particular to improve the performance of error-correcting decoding in a (destination) receiver. The relaying is performed by a relay that co-operates with the sources and with another relay in order to obtain communication that is more reliable between the sources and the destination.

The invention relates particularly, but not exclusively, to transmitting data via mobile networks, e.g. for real-time applications or via networks of sensors, e.g. for returning measurements. It applies more particularly to so-called "full-duplex" (FD) relays with links between the nodes that may equally well be non-orthogonal (with interference), semi-orthogonal (with some interference), or orthogonal (with no interference). In this application, a link is a communication channel between two or more nodes, and it may be physical or logical. When the link is physical, it is generally referred to as a channel.

PRIOR ART

Networks, and in particular mobile networks, are looking for significant improvements in terms of capacity, reliability, consumption, etc. The transmission channel of a mobile network has the reputation of being difficult, and leads to transmission reliability that is relatively poor. Over the last few years, considerable progress has been achieved in terms of encoding and modulation, in particular concerning consumption and capacity. Specifically, in a mobile network where a plurality of transmitters/receivers share the same resources (time, frequency, and space) it is necessary to reduce transmission power as much as possible.

Such reduction goes against the coverage, and thus against the capacity, of the system, and more generally against its performance.

In order to increase coverage, to make communication more reliable, and more generally to improve performance, one approach consists in relying on relays for increasing spectrum efficiency (coding gain) and thus improving the transmission efficiency and the reliability of systems (diversity gain). The basic topology of MARC systems as shown in FIG. 1 is such that the resources, nodes $S_1$ and $S_2$, broadcast their coded information sequences for the attention of the relay R and of the destination D. The relay decodes the signals received from the sources $S_1$ and $S_2$ and it re-encodes these jointly while adding its own redundancy so as to create a spatially-distributed network code as seen from the receiver D. At the destination D, the decoding of the three spatially-distributed coded sequences, comprising the two coded sequences received directly from the sources $S_1$ and $S_2$ together with the coded sequence coming from the relay, relies on joint channel and network decoding algorithms.

Network coding is a form of cooperation in which the nodes of the network share not only their own resources (power, bandwidth, etc.) but also their computation capacity, in order to create a distributed code that becomes more and more powerful as the information propagates through the nodes. It gives rise to substantial improvement in terms of diversity and of encoding, and thus in terms of transmission reliability.

A distinction is made between two types of operation for the relay: half-duplex mode and full-duplex mode. The invention applies to full-duplex relays.

In full-duplex mode, the relay receives new information blocks from both sources and simultaneously transmits to the destination information based on the previously received blocks; the relay can thus receive and transmit simultaneously on the same frequency band or on different bands. In comparison with a half-duplex relay, a full-duplex relay makes it possible to achieve greater capacity.

Patent application WO 2011/033237 (07469) relates to a MARC system with a full-duplex relay implementing a transmission protocol of the Markov chain type. In that protocol, the destination observes block-coded information coming from the two sources $S_1$, $S_2$ superposed on the preceding block-coded information coming from the relay. Thereafter, the processing on reception needs to make joint use of a plurality of successive blocks. In the protocol used, as shown in FIG. 2, each source has T K-bit messages for transmitting during a time slot t, $t \in \{1, \ldots, T\}$. At the end of each time slot t, where $t \in \{1, \ldots, T\}$ the relay $R_1$ attempts to decode the messages from the sources and to transmit the result of a deterministic function of the decoded messages during the time slot t+1. The protocol thus requires T+1 time slots in order to transmit the T messages. The destination attempts to decode the messages from the sources at the end of time slot T+1 by using the signals transmitted throughout the period of the T+1 time slots. Such a protocol is complex to implement when the relays perform soft type decoding with log likelihood ratios (LLRs) being transmitted to the destination.

Patent application WO 2012/022905 (07776) relates to a MARC system implementing a relaying protocol that does not transmit words that have been decoded erroneously by using a "selective decode and forward" (SDF) technique. Error detection in the relay is based on verifying the cyclic redundancy check (CRC) included in each source message. That protocol serves to reduce the complexity of decoding at the destination and at the relay, while conserving high capacity when the protocol is implemented with a full-duplex (FD) relay. With reference to FIG. 2, if the relay has correctly decoded the sources at the end of the time slot t, then during the time slot t+1 it transmits a payload signal to help both sources. If only one source is correctly decoded, then the signal is representative of that source only. If neither source is correctly decoded, then the relay remains silent.

MAIN CHARACTERISTICS OF THE INVENTION

The invention relates to transmitting a digital signal in a network having at least five nodes comprising two transmitters, first and second relays, and a destination, the method enabling transmission capacity to be optimized when the first relay is a full-duplex relay, which is thus capable of receiving and transmitting simultaneously, while limiting the complexity of decoding at the relay and at the destination.

The invention provides a relaying method implemented by the full-duplex relay for a telecommunications system comprising a plurality of sources, the full-duplex relay and at least one other full-duplex relay, and a destination. The method comprises:
- a decoding step, for estimating for each source code words $x_{S,t}$ from received blocks corresponding to successive code words $x_{S,t}$ transmitted simultaneously by the sources during T time slots, such that, at each time slot t, t=1, ..., T, a code word comprises B blocks $x_{S,t}^{(1)}, x_{S,t}^{(2)}, \ldots, x_{S,t}^{(B)}$ of which the first can be decoded independently of the other blocks, a code word $x_{S,t}$ encoding a K-bit message $u_{S,t}$;
- a step of the relay detecting messages that have been decoded without error and taking a decision; and
- a step of encoding a signal and of transmitting it to the destination, which signal is representative only of messages that have been decoded without error.

The method is such that while estimating the messages from the sources, the relay takes account of a signal transmitted by the other relay representative of messages from sources that have been decoded without error by that other relay, and the encoding and transmission are under the control of the step of detecting the messages that have been decoded without error and of taking a decision in accordance with a selection scheme, after each received block.

The invention also provides a full-duplex relay for a telecommunications system comprising a plurality of sources, the relay, at least one other relay, and a destination. The relay comprises:
- a decoding unit, for estimating for each source code words $x_{S,t}$ from received blocks corresponding to successive code words $x_{S,t}$ transmitted simultaneously by the sources during T time slots, such that, at each time slot t, t=1, ..., T, a code word $x_{S,t}$ comprises B blocks $x_{S,t}^{(1)}, x_{S,t}^{(2)}, \ldots, x_{S,t}^{(B)}$ of which the first can be decoded independently of the other blocks;
- a decision unit for detecting messages that have been decoded without error and for taking the decision; and
- an encoding and transmission unit for encoding a signal and for transmitting it to the destination, which signal is representative only of messages that have been decoded without error.

The relay is such that, when estimating messages from the sources, the decoding unit takes account of a signal transmitted by the other relay representative of messages from sources that have been decoded without error by that other relay, and the encoding and transmission unit is under the control of the detection unit for detecting errors and taking a decision in accordance with a selection scheme, after each received block.

Thus, the relay forms part of a MAMRC system (multiple-access multiple relay channel) that comprises at least two sources (transmitters), the relays, and the destination. The MAMRC system may have more than two transmitters (sources). The transmitters transmit simultaneously to the same receiver (destination), thus enabling maximum use to be made of the common spectrum resource.

The transmission by the sources may take place simultaneously over the same radio resource (time and frequency), which makes it possible to maximize use of the common spectrum resource; the source-relay links are then not orthogonal. There is thus interference between the signals received by the relay and by the destination as a result of the source signals being superposed during transmission, firstly between the sources and the relay and secondly between the sources and the destination (the receiver).

In an embodiment, the sources transmit simultaneously over the same radio resource, and the decoding step at the relay is iterative and comprises joint detection and joint decoding. The joint detection and decoding in the relay make it possible to separate the streams transmitted simultaneously by the two transmitters.

When the sources transmit simultaneously but over different spectrum resources, the relay does not need the iterative joint detection and decoding step. Under such circumstances, the relay can decode the messages from the sources on the basis of sequences received without interference between the sources. Under such circumstances, the source-relay links are orthogonal.

A MAMRC system may be such that the relays do not listen to one another. In a particularly simple implementation, they do not interfere with one another because they transmit over different radio resources. This implementation is used more particularly when access to the channel is of the frequency division multiple access (FDMA) type; the sources then access the channel on a common frequency band, while each relay accesses the channel on a frequency band that is specific to each relay. Optionally one of the relays uses the same band as the sources. In order to recover diversity of order N+1 with N relays and M sources, this implementation implies that once N>1 the relays perform network encoding in a Galois field of cardinal number greater than two. Non-optimum use of the radio resource leads to a protocol that is simple, to little modification of the relay compared with a full-duplex relay adapted to a MARC system (with only one relay), and to an increase in the payload information that can be used by the destination, but nevertheless at the price of network decoding at the destination that is somewhat more complex than it would be in a MARC system.

A relay listening to one or more relays in addition to the sources receives the signals in the same manner as would the destination in a MARC system. i.e. it simultaneously detects and decodes the messages from the sources and the information transmitted by the other relay. This implementation leads to optimum use of the radio resource and of the network encoding, but nevertheless at the price of increasing the complexity of the relays and of the destination. In an embodiment of the relays, the encoding and forwarding step comprises network encoding that is a non-bijective surjective function applied to the messages that are decoded without error.

The use of encoding at the source (transmitters) whereby the first block can be decoded independently of the other blocks avoids the need for an additional time slot; T messages are transmitted for each transmitter in T time slots. The encoding at the source may be encoding of the finite incremental redundancy type.

The encoding at the relays, which includes network encoding and channel encoding, enables all of the dispersed transmitters to benefit from the improved encoding of a spatially distributed network code, without decreasing spectrum efficiency. This makes it possible in the receiver to implement iterative decoding that relies on redundancies generated in the relays without requiring power to be increased in the transmitters in order to achieve an increase in the coverage of the system and in spectrum efficiency.

By not transmitting the messages that are detected with error, the transmission protocol avoids any propagation of transmission errors as introduced more particularly when the links from the transmitters to the relay are not very reliable. Interleaving messages that have been detected without error is a known technique that is necessary for achieving joint channel decoding at the destination of the signals from the transmitters and of the signal from the relay.

The protocol contributes to reducing energy consumption by combating error propagation and by effectively combating interference (when it is cooperating, the relay always transmits payload information).

The protocol makes it possible to reach a maximum data rate by controlling the encoding and the transmission without waiting for the messages from all of the transmitters to be decoded without error and without waiting for the end of the time slot or without waiting for the last time slot. Thus, during a time slot, the relay transmits redundancy relating to a message that has been decoded without error during the same time slot. As a result, additional redundancy is transmitted almost immediately to the destination, which redundancy is determined by the relay, even while the relay continues to decode messages coming from the other transmitters, which is not possible with a relay of the half-duplex type. The protocol gives particularly good performance since by making full use of the ability of a full-duplex relay to receive and transmit simultaneously, it does not require a threshold concerning a number of time slots in order to decide whether to switch between detecting messages and encoding messages that have been detected without error.

When the various messages transmitted by the transmitters are mutually independent, the protocol avoids introducing pointless latency in the processing on reception of these messages, as can happen in the prior art by waiting for the end of the time slot T+1 before attempting to decode all of the messages, or by the relay waiting for a certain number of time slots to elapse before switching to encoding. Instead of being silent during a time slot $t \in \{2, \ldots, T\}$ in the absence of any message that has been decoded without error at the end of timeslot t-1, the relay can provide help for any message that has been decoded without error previously, i.e. during the time slots $1, \ldots, t-1$. The transmission protocol of the invention thus ensures full use is made of the full-duplex capabilities of a relay, and leads to optimized transmission capacity.

The relays may equally well be stationary relays or mobile relays. Given the density of communications to be transmitted in densely populated zones, the number of relays may be large, and much greater than two. Specifically, in order to cover such zones, stationary relays may be used in preference to base stations, which are of a cost that can be considerably greater. Alternatively, it is possible to use mobile relays. Such mobile relays are typically mobile terminals.

In an implementation, messages that have been decoded without error are detected by means of a CRC type code included in each K-bit message $u_{s,t}$.

In an implementation, the messages that have been decoded without error are stored.

By storing the messages that have been decoded without error, a relay can make use several times over of the same message that has been decoded without error, i.e. it can use it during a plurality of time slots, in order to generate the signal going to the destination.

In an implementation, in the absence of a message that has been decoded without error during a current time slot t, the error detection and decision taking step allows a message that has been decoded without error during a preceding time slot to be encoded and transmitted.

Instead of being silent during the time slots following the current time slot t while waiting to decode correctly the message from another source, the relay can continue to transmit the redundancy determined on the message from the source that has been decoded without error during an earlier time slot $1, \ldots, t-1$.

In an implementation, the decision taken allows a message to be encoded and transmitted as soon as it has been decoded without error.

Thus, the relay of the invention transmits redundancy to the destination without delay, i.e. without waiting for the end of the time slot, which redundancy relates to the source that has been decoded without error, thus providing help to the destination in decoding the same source. This gain provided for one source can be beneficial to the other sources. Specifically, by releasing decoding means both in the relay and in the destination in order to concentrate on the sources that have not yet been decoded correctly, the protocol increases the probability of decoding all of the sources without error.

In an implementation, after each received block, detection and decoding are under the control of the step of detecting messages that have been decoded without error and of taking a decision in compliance with a selection scheme.

In this implementation, detection and decoding may be adapted as a function of error detection.

In an implementation, if all the messages are decoded without error during a current time slot t, then the step of detecting messages that have been decoded without error and of taking decisions stops detection and decoding until the end of the current time slot and allows encoding and transmission.

More particularly, this implementation makes it possible to emphasise the reduction in energy consumption by avoiding any pointless expenditure of the detection and decoding means. It also makes it possible to concentrate the energy of the relay on other means.

In an implementation, the selection scheme is such that, at each current time slot t, the transmitted signal is representative of the messages decoded without error up to the current time slot t.

Thus, the destination can benefit from a plurality of different redundancies for a single message correctly decoded by the relay. The destination making use of these various occurrences contributes to increasing the probability of correctly decoding the received messages.

In an implementation, the selection scheme is such that, during each current time slot t, the transmitted signal is representative of the messages that have been decoded without error solely during the current time slot t.

This implementation has the advantage of being simple since it requires little signalling.

In an implementation, the encoding and transmission step includes interleaving for each source for which a message has been decoded without error prior to network coding.

Interleaving at the input to network coding makes it possible for the destination to have a structure similar to parallel concatenation (similar to a distributed turbo-code). As a function of the way the network coding is decoded at the destination, the interleaving may optionally be different among the sources.

In an implementation, the encoding and transmission step comprises network coding followed by first interleaving, by channel coding, and by second interleaving distinct from the first.

The second interleaving makes it possible to give a certain signature to the signal transmitted by the relay, thus making it possible to distinguish it from the signals transmitted simultaneously by the transmitters.

After separating the signal transmitted by the relay, the first interleaving, which may optionally be variable as a function of the block, makes it possible to distinguish (in the statistical independence meaning) between network coding and channel coding.

In an embodiment, the full-duplex relay further comprises a unit for storing the messages that have been decoded without error.

In an embodiment, the full-duplex relay is such that, after each received block, the decoding unit is under the control of the unit for detecting errors and for taking a decision in compliance with a selection scheme.

In an embodiment, the full-duplex relay is such that the encoding and transmission unit includes one interleaver per source for which a message has been decoded without error at the input of a network code.

In an embodiment, the full-duplex relay is such that the encoding and transmission unit includes a network code followed by a first interleaver, by a channel encoder, and by a second interleaver distinct from the first.

The invention also provides a MAMRC system in which the relay is a full-duplex relay of the invention.

Invention also provides a reception method for a destination of a MAMRC system that is to perform a relaying method of the invention. The reception method comprises:
  joint detection and decoding of blocks coming from the sources and of messages coming from the relays, the detection and decoding being performed iteratively at the end of each time slot t such that $t \in \{1, \ldots, t-Q-1\}$ over the duration of a sliding window of length Q, $Q \in \{1, \ldots, T\}$, with propagation of probabilities between the iterations in order to estimate Q messages for each source.

The reception method is such that the decoding of messages from the relays is configured at each sub slot in compliance with signalling information coming from each relay indicating whether the relay is cooperating on this block b, b=1, . . . B, and such that probability propagation is configured at each block b, b=1, . . . B, in compliance with signalling information coming from each relay indicating the selection scheme of the relay.

The invention also provides a receiver for a MAMRC system for performing a relaying method of the invention. The receiver comprises:
  a detection and decoding unit for joint detection and decoding of blocks coming from the sources and of messages coming from the relays, the detection and decoding being performed iteratively at the end of each time slot t such that $t \in \{1, \ldots, t-Q-1\}$ over the duration of a sliding window of length Q, $Q \in \{1, \ldots, T\}$, with propagation of probabilities between the iterations in order to estimate Q messages for each source.

The receiver is such that the detection and decoding of messages from the relays is configured at each sub slot in compliance with signalling information coming from each relay indicating whether the relay is cooperating on this block b, b=1, . . . B, and such that probability propagation is configured at each block b, b=1, . . . B, in compliance with signalling information coming from each relay indicating the selection scheme of the relay.

The invention also provides a method of transmitting a digital signal for a telecommunications system comprising a plurality of sources, at least two relays, and a destination implementing a spatially distributed network code, the method comprising for each source:
  a step of encoding messages $u_{S,t}$ including respective CRCs into code words $c_{s,t}$; and
  a step of transmitting the code words $c_{s,t}$ during T time slots to the relays and to the destination.

The transmission method is such that the encoding is of finite incremental redundancy type and, at each sub slot b=1, 2, . . . , B of a time slot, it delivers a block $c_{S,t}^{(b)}$ such that the B successive blocks $\{c_{S,t}^{(b)}:1 \leq b \leq B\}$ form the code word $c_{s,t}$, such that the first block can be decoded independently of the other blocks, and such that the following blocks are parity bits that add redundancy to the first block.

The invention also provides a transmitter for transmitting a digital signal for a telecommunications system comprising a plurality of sources, at least two relays, and a destination implementing a spatially distributed network code, comprising for each transmitter:
  an encoder for encoding messages $u_{S,t}$ having respective CRCs into code words $c_{s,t}$; and
  a transmitter for transmitting code words $c_{s,t}$ during T time slots to the relays and to the destination.

The transmitter is such that the encoder is of finite incremental redundancy type and, at each sub slot b=1, 2, . . . , B of a time slot, it delivers a block $c_{S,t}^{(b)}$ such that the B successive blocks $\{c_{S,t}^{(b)}:1 \leq b \leq B\}$ form the code word $c_{s,t}$, such that the first block can be decoded independently of the other blocks, and such that the following blocks are parity bits that add redundancy to the first block.

In a preferred implementation, the steps of the relaying method are determined by instructions of a relaying program incorporated in one or more electronic circuits such as chips, which themselves may be arranged in electronic devices of the MAMRC system. The relaying method of the invention may equally well be performed when the program is loaded into a calculation member such as a processor or the equivalent with its operation then being controlled by executing the program.

Consequently, the invention also applies to a computer program, in particular a computer program on or in a data medium, and suitable for performing the invention. The program may use any programming language, and it may be in the form of source code, object code, or code intermediate between source code and object code, such as in a partially compiled form, or in any other desirable form for implementing a method of the invention.

The data medium may be any entity or device capable of storing the program. For example, the medium may comprise storage means such as a read only memory (ROM), for example a compact disk (CD) ROM or a microelectronic circuit ROM, or indeed magnetic recording means, e.g. a hard disk, or a universal serial bus (USB) stick.

Alternatively, the data medium may be an integrated circuit in which the program is incorporated, the circuit being adapted to execute or to be used in the execution of the method in question.

Furthermore, the program may be converted into a transmissible form such as an electrical or optical signal that can be conveyed via an electrical or optical cable, by radio, or by other means. The program of the invention may in particular be downloaded from a network of the Internet type.

The invention thus also provides a computer program on a data medium including program instructions adapted to performing a method of relaying a digital signal of the invention, when said program is loaded and executed in a relay for a MAMRC system for performing the relaying method.

The invention also provides a data medium including program instructions adapted to performing a method of relaying a digital signal of the invention, when said program is loaded and executed in a relay for a MAMRC system for performing the relaying method.

LIST OF FIGURES

Other characteristics and advantages of the invention appear more clearly on reading the following description of implementations given merely as illustrative and nonlimiting examples, and from the accompanying drawings, in which.

Figure 12:
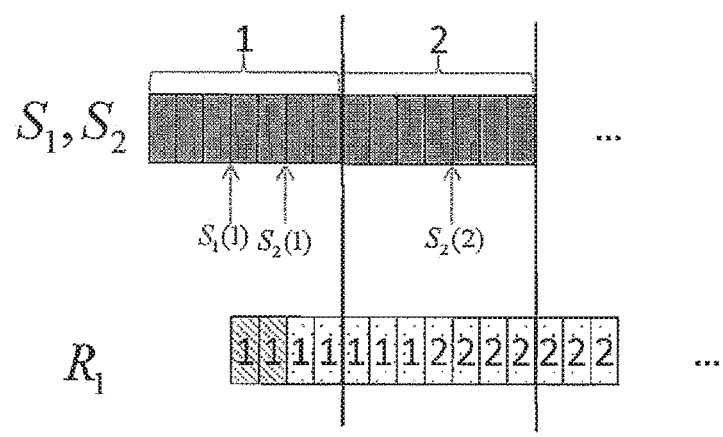
Figure 12:
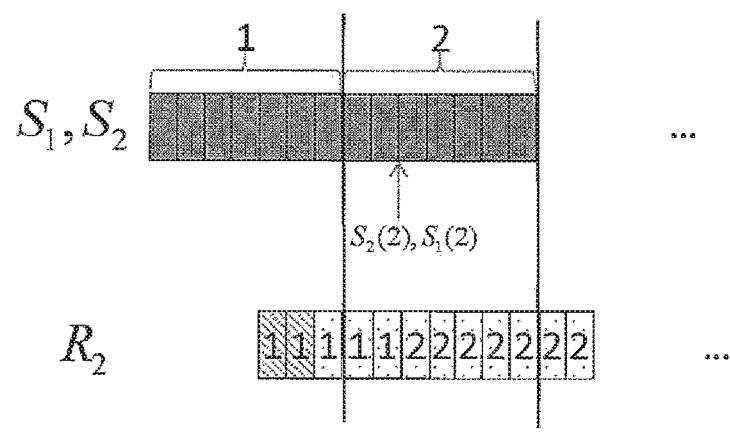
Figure 13:
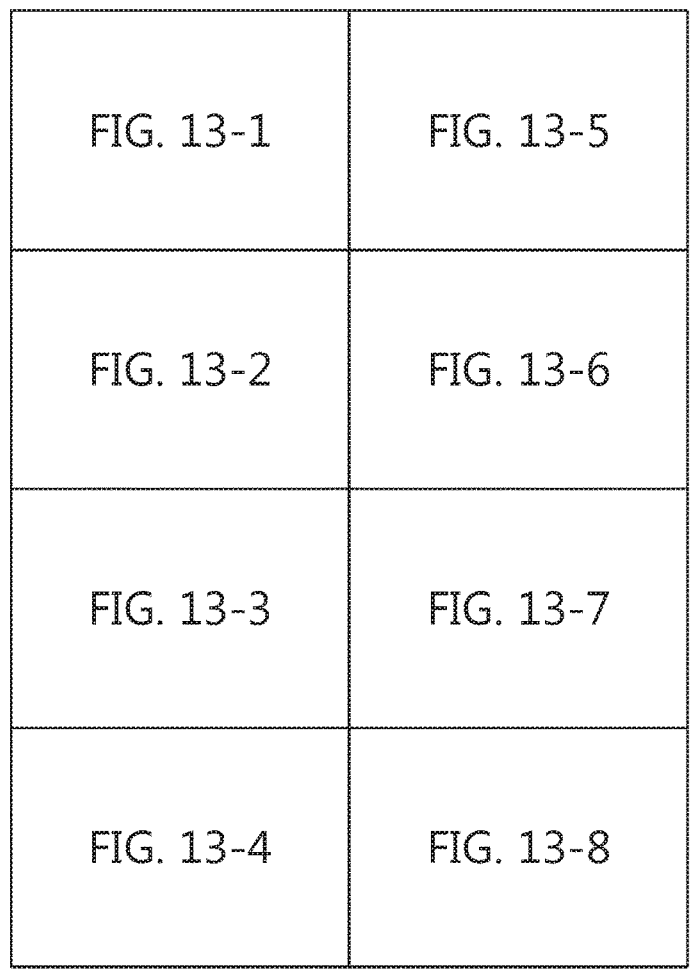
Figures 1, 13:
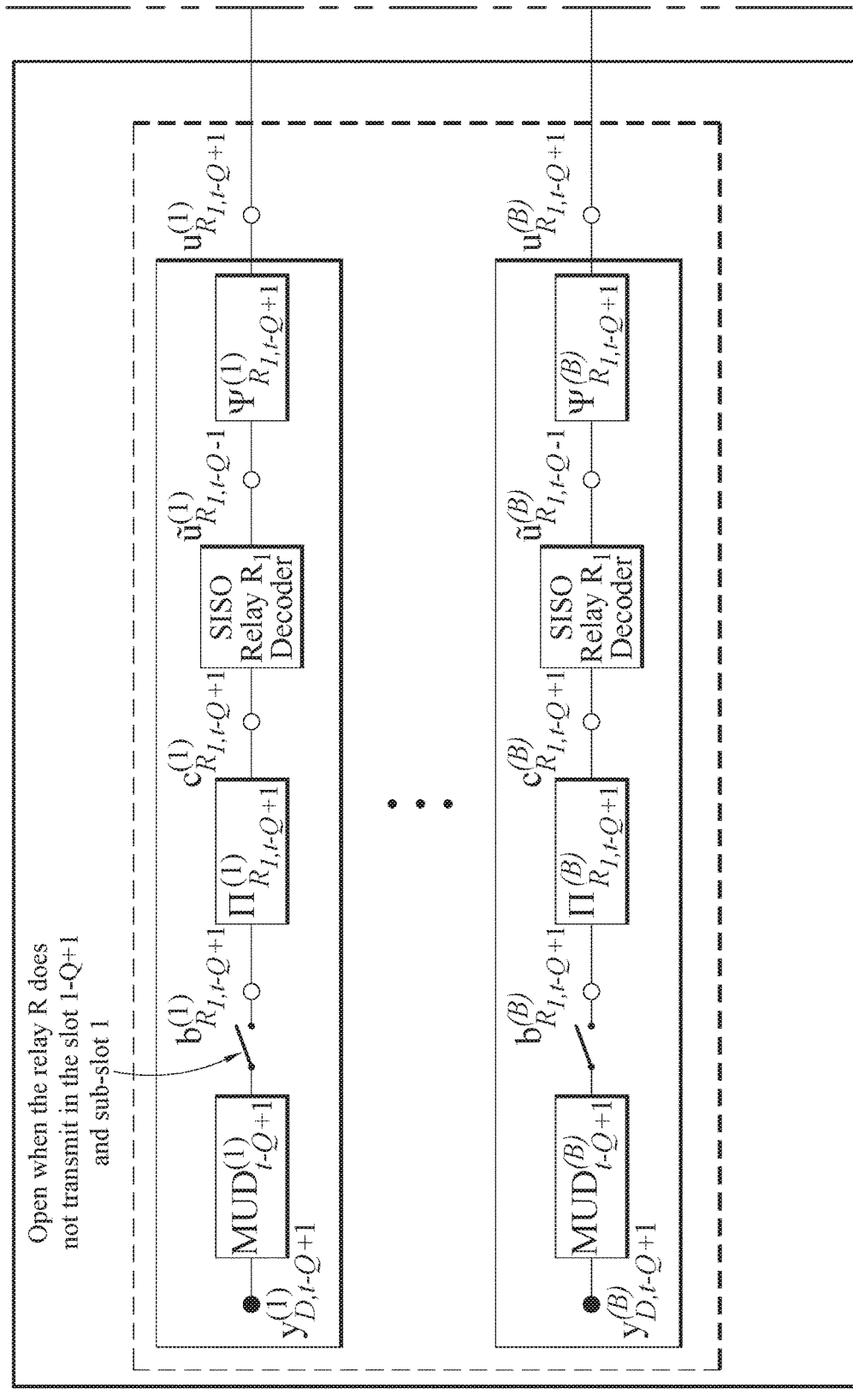
Figures 2, 13:
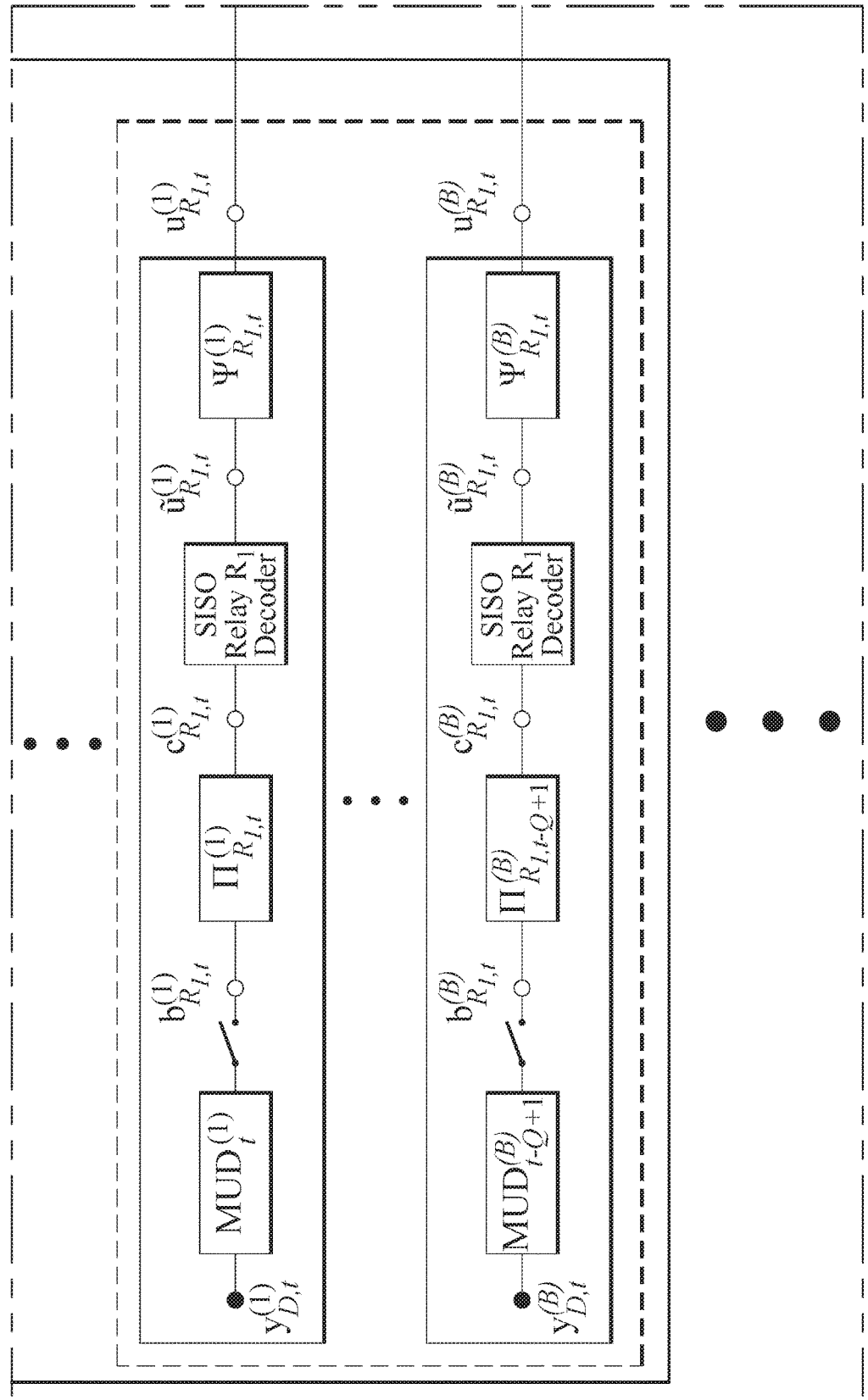
Figures 3, 13:
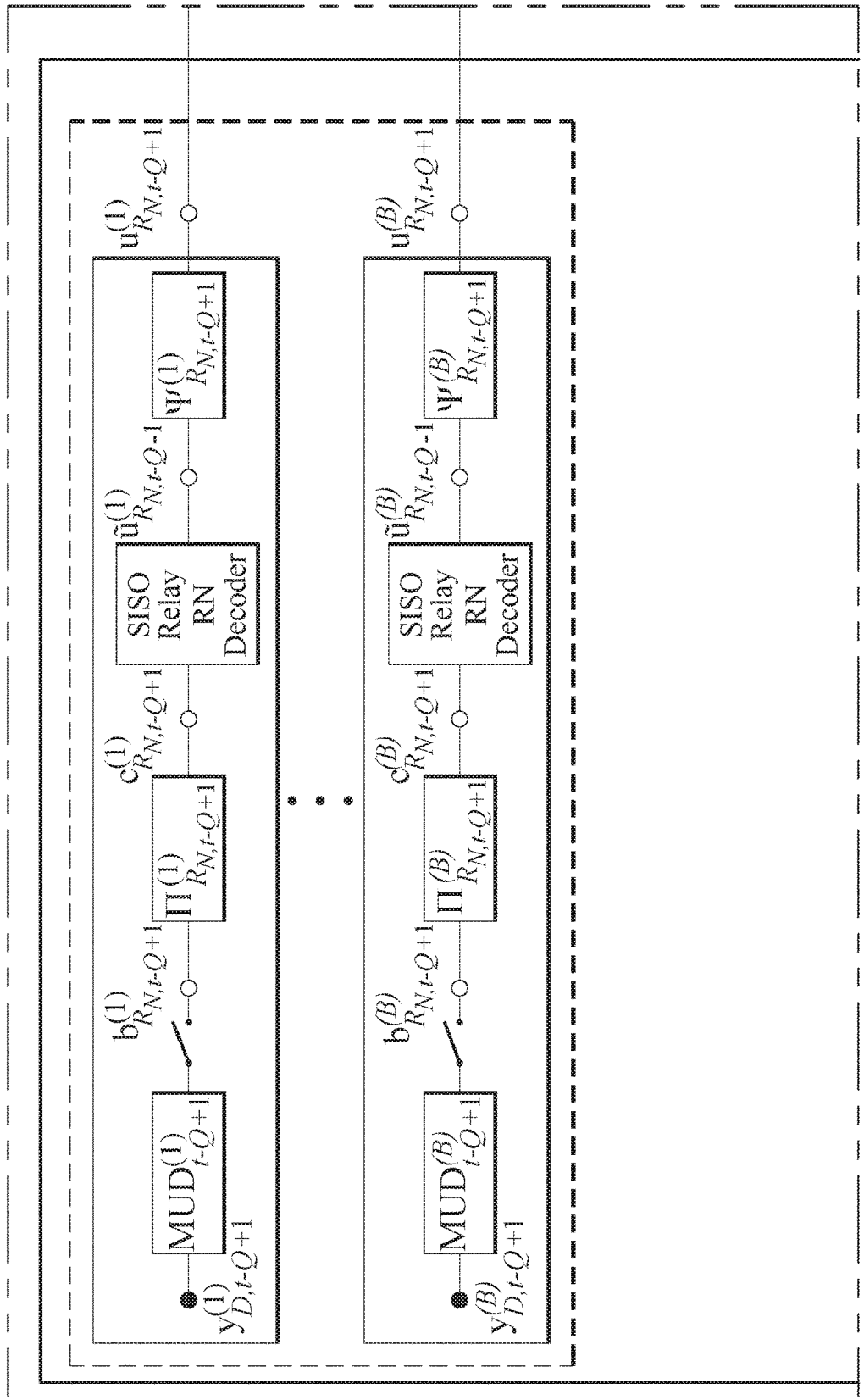
Figures 4, 13:
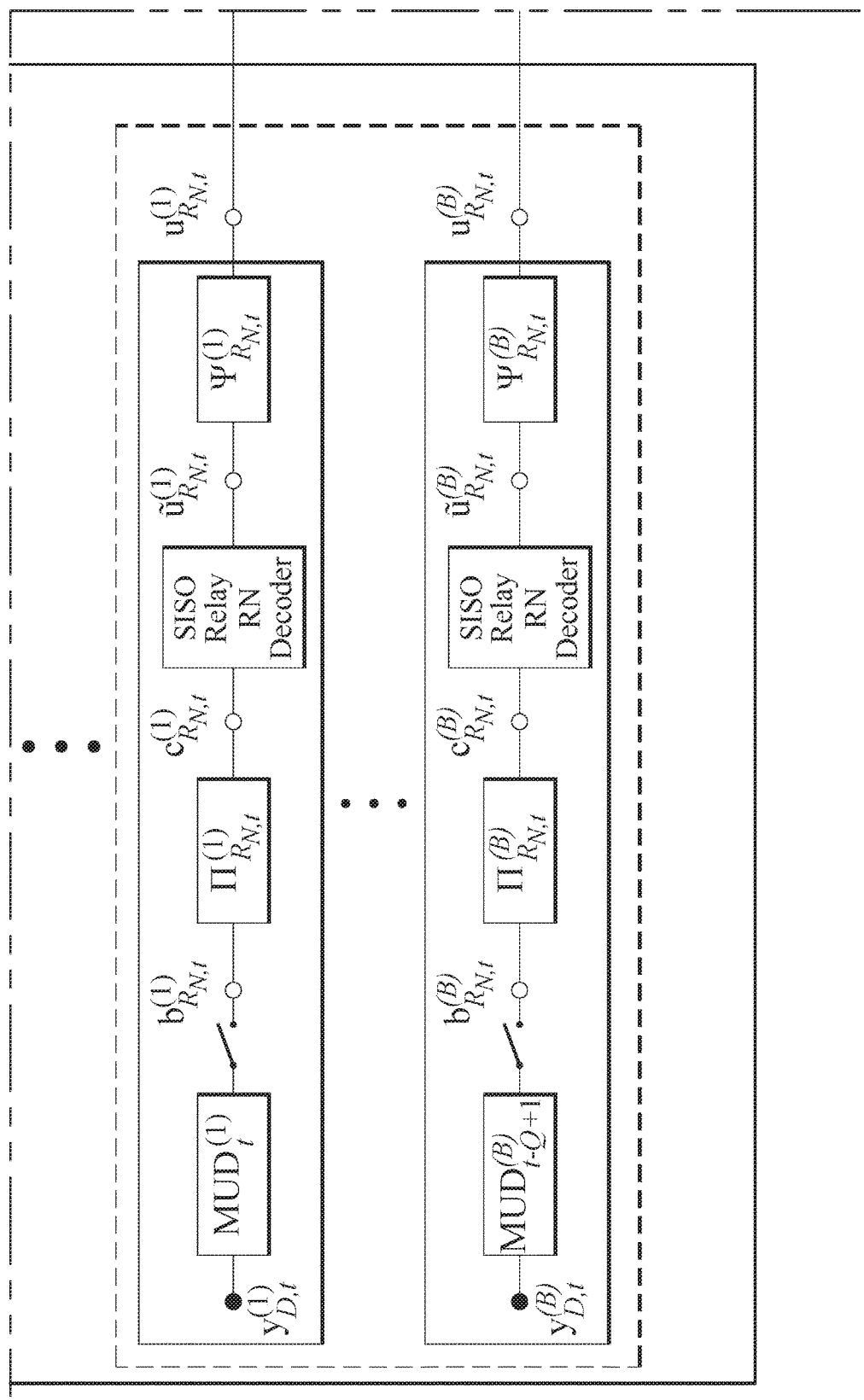
Figures 5, 13:
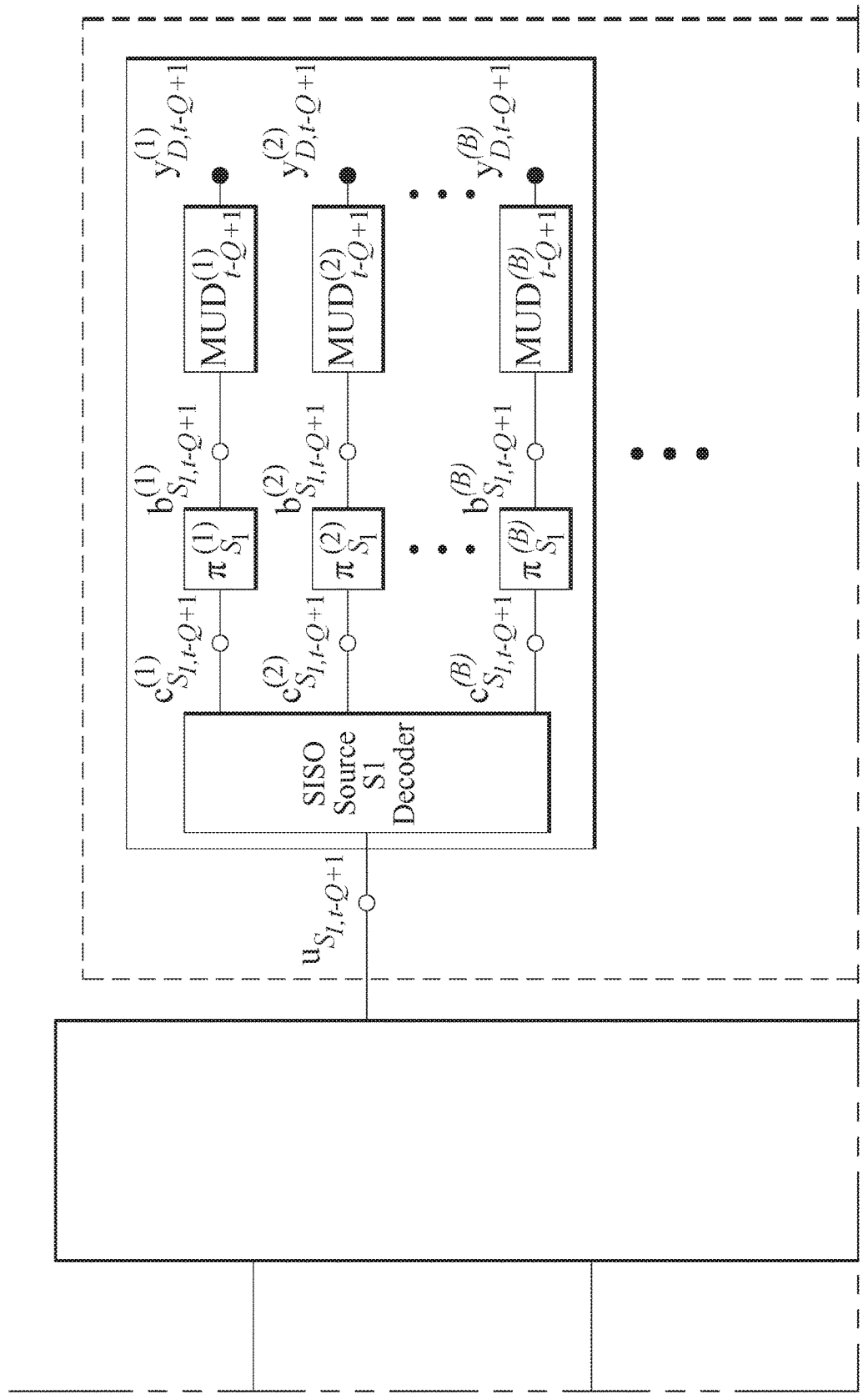
Figures 6, 13:
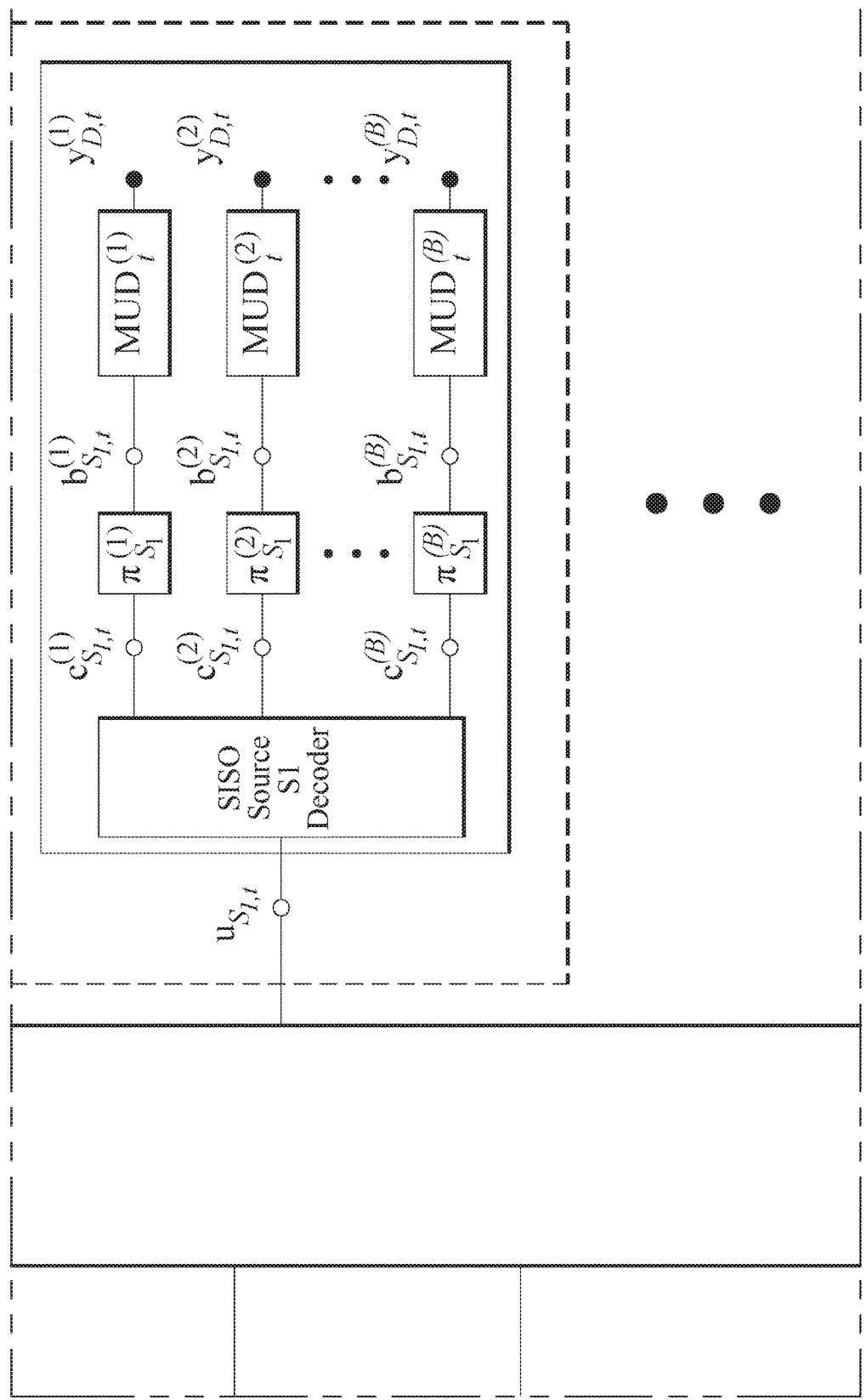
Figures 7, 13:
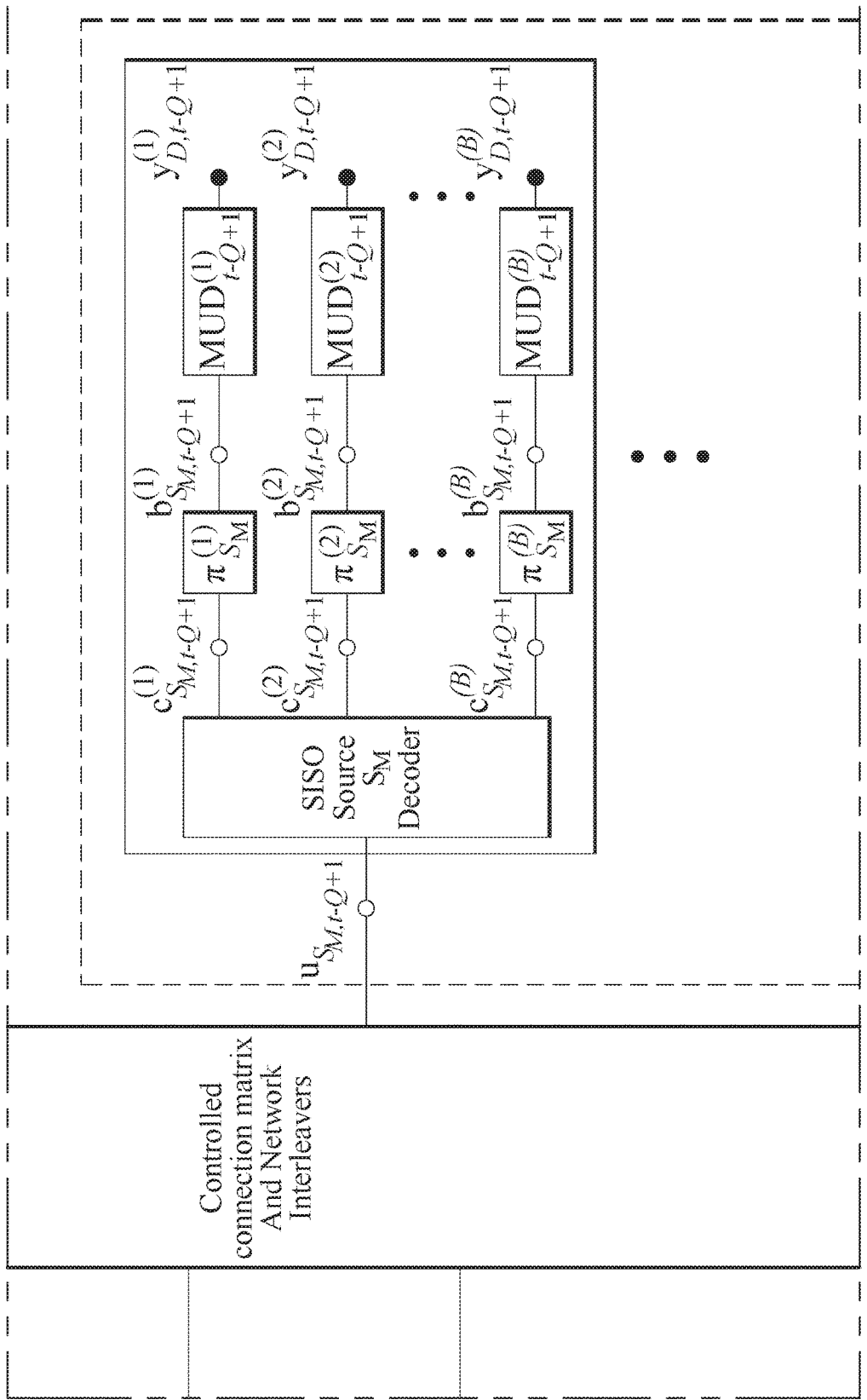
Figures 8, 13:
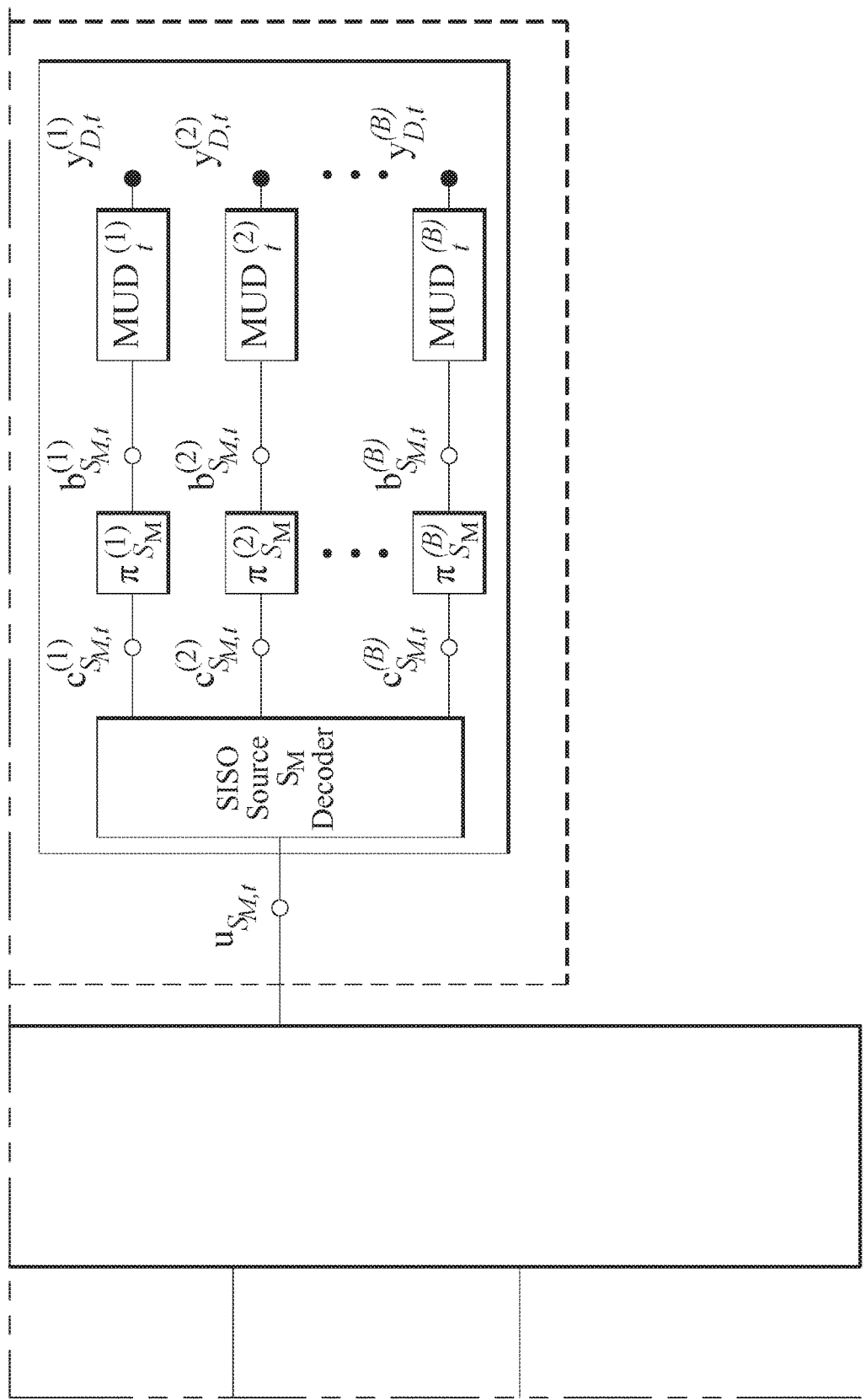

FIG. 12 shows an example of cooperation between the relay $R_1$ and the relay $R_2$ of a MAMRC system having two sources $S_1$ and $S_2$, the two relays listening to each other during the timeslots $t \in \{1, \ldots, T\}$, each of which is subdivided into B sub slots; and FIG. 13 is in the form of a factor graph showing the iterative structure of the destination decoder used for decoding the sources $S_1$ to $S_M$ during the time slots from t to t−Q+1.

DETAILED DESCRIPTION OF PARTICULAR EMBODIMENTS

Figure 1:
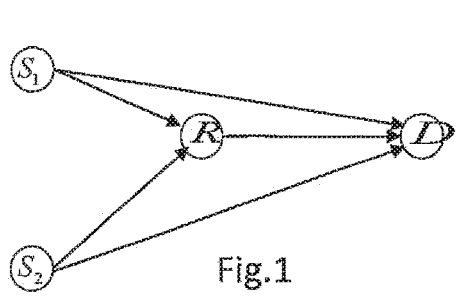
FIG. 1 is a diagram showing the basic topology of MARC systems.
Figure 3:
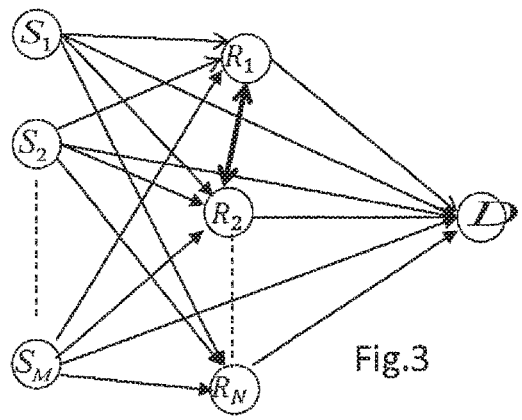
FIG. 3 is a diagram showing the topology of a MAMRC system having M sources, N relays $\{R_1, R_2, \ldots, R_N\}$, and one destination.
Figure 2:
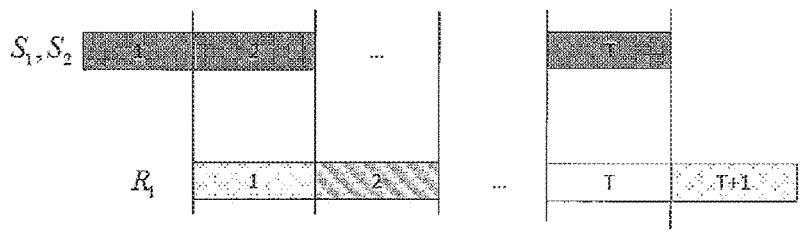
FIG. 2 is a diagram showing a prior art cooperation protocol in which the sources transmit during T time slots, and the relay co-operates after the end of each time slot, thereby leading to cooperation that requires T+1 time slots.

The context of the invention is one in which a plurality of sources (transmitters) $S_1, \ldots, S_M$ seek to send their respective messages to a common destination D with the help of a plurality of full-duplex relays $\{R_1, R_2, \ldots, R_N\}$ including at least one, $R_1$, that makes use of the signal transmitted by another one of the relays, as shown in FIG. 3.

There is no constraint on the transmission channel; it may be subject to fast or slow fading, it may be frequency selective, and it may be a multiple-input and multiple-output (MIMO) channel. In the description below, the nodes (sources, relays, and destination) are assumed to be accurately synchronized, and the sources are independent (there is no correlation between them).

A transmission cycle is made up of T time slots. The duration of a cycle depends on the settings of the MAMRC system and in particular on the MAC layer of the seven-layer OSI model. At each time slot, each source has a K-bit message for transmitting. CRC type information forms part of the K-bit message transmitted by a source, and it is used to determine whether a received message has been decoded correctly. The T messages from a source may be independent of one another or they may be correlated and constitute a frame.

The sources transmit simultaneously. The relay $R_1$ attempts to transmit a payload signal to the destination, which signal is representative of estimated messages in order to provide help in communication between the sources and the destination. The relay $R_1$ co-operates with the sources while making use at least of the signal transmitted by another relay of the system.

$F_2$ is the two element Galois field, R is the real number field and C is the complex number field.

Figure 4:
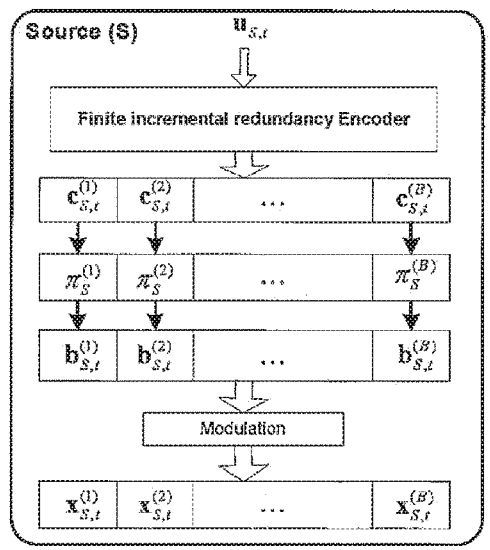
FIG. 4 is a diagram of an implementation of the processing implemented by a source of the invention.

The transmission scheme at the sources is shown in FIG. 4.

At each time slot t, t=1, ..., T, each source S from among the M sources $\{S_1, S_2, \ldots, S_M\}$ has a message $u_{S,t}$ made up of K bits of information for transmission, $u_{S,t} \in F_2^K$. The message $u_{S,t}$ includes a CRC type code that makes it possible to verify the integrity of the message $u_{S,t}$.

The statistically independent sources $\{S_1, S_2, \ldots, S_M\}$ perform encoding of the message $u_{S,t}$ by means of an incremental redundancy code and they transform the message $u_{S,t}$ into $n_S$ bits written $c_{S,t} \in F_2^{n_S}$. The resulting code word $c_{S,t}$ is segmented into B redundancy blocks, each of which is transmitted during a sub slot, written $c_{S,t}^{(b)} \in F_2^{n_{S,b}}$ with b=1, 2, ..., B. Each block comprises $n_{S,b}$ bits, with $$n_S = \sum_{b=1}^{B} n_{S,b}.$$

The incremental redundancy code may be of the systematic type, in which case the information bits are included in the first block: $u_{S,t} \in c_{S,t}^{(1)}$. Regardless of whether or not the incremental redundancy code is of the systematic type, it is such that the first block $c_{S,t}^{(1)}$ from among of the B blocks can be decoded independently of the other blocks. The highest coding rate at the source S is $K/n_{S,1}$ and it cannot be greater than one, $n_{S,1} \geq K$. The minimum coding rate for a source S is $K/n_S$. Each block $\{c_{S,t}^{(b)} : 1 < b \leq B\}$ after the first block includes parity bits that add redundancy to the first block, each of the blocks $\{c_{S,t}^{(b)} : 1 < b \leq B\}$ being capable of being decoded jointly with the first block.

By way of example, the incremental redundancy code can be provided in practice by means of a finite family of punctured linear codes with compatible coding rates or of codes without coding rates that have been modified to operate with finite lengths: raptor code (RC), rate compatible punctured turbo code (RCPTC), rate compatible punctured convolutional code (RCPCC), rate compatible low density check code (LDPC).

Each block $c_{S,t}^{(b)}$ is interleaved by a distinct interleaver written $\pi_S^{(b)}$, the code word after interleaving being written $b_{S,t}=[b_{S,t}^{(1)}, b_{S,t}^{(2)}, \ldots, b_{S,t}^{(B)}]$. The interleavers serve to combat fading, which may occur during transmission via the channel, and to give each source a fingerprint that makes the sources easier to separate by the relay and by the destination. Each interleaved portion $b_{S,t}^{(b)}$ of the code word is modulated in order to obtain a complex code word $x_{S,t}=[x_{S,t}^{(1)}, x_{S,t}^{(2)}, \ldots, x_{S,t}^{(B)}]$ with $x_{S,t}^{(b)} \in X^{N_b}$, $b=1, 2, \ldots, B$, where $X \subset C$ designates a complex signal of cardinal number $|X|=2^{q_S}$ and where $N_b = n_{S,b}/q_S$.

Each source S from among the M sources $\{S_1, S_2, \ldots, S_M\}$ may use a minimum coding rate $K/n_S$ and a modulation order $q_s$ that are different from those of the other sources, in so far as the sub slots of the transmitted complex code words are identical between the sources: $n_{S,b}/q_S = N_b$, $b=1, 2, \ldots, B$.

Each source S transmits the code word $x_{S,t} = [x_{S,t}^{(1)}, x_{S,t}^{(2)}, \ldots x_{S,t}^{(B)}]$ made up of B blocks during a time slot that is subdivided into B sub slots. Whatever the value of b, $1 \leq b \leq B$, the concatenation (or accumulation) of the blocks 1 to b is itself a code word since it comes from the incremental redundancy encoder.

In order to simplify reception structure at the relays and at the destination, the sources described have interleavers, an encoder, and a modulator that do not vary as a function of the time slot t, $t=1, \ldots, T$, but it would be equally possible for them to be variable.

The invention proposes a novel approach for the cooperation of a relay of a MAMRC system in order to give help to the sources that transmit, thereby obtaining an improvement in the spectrum efficiency of the transmission while enabling the encoding to be simple and effective in the receiver of the destination.

A relaying method of the invention is implemented by the at least one full-duplex relay $R_1$ for a MAMRC system. Any other relay of the MAMRC system can also make use of the signal(s) transmitted by one or more relays in order to help it in estimating the messages from the sources.

Figure 5:
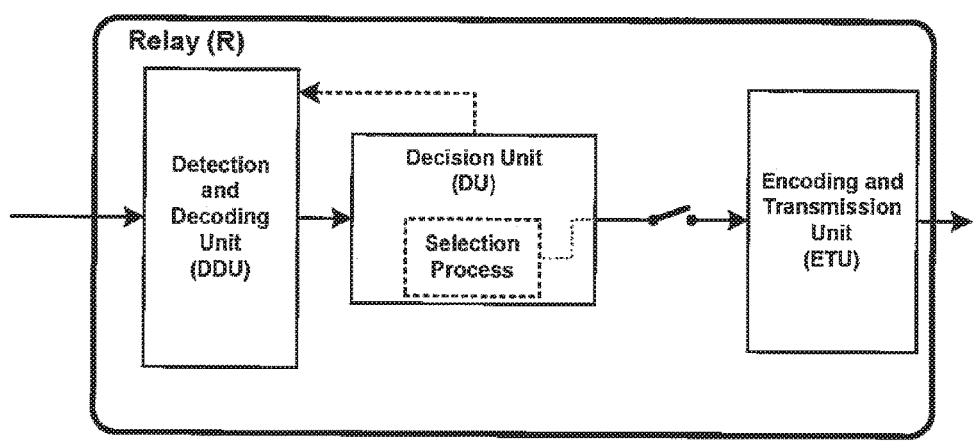
FIG. 5 is a diagram of an embodiment of a relay of the invention.

The relay $R_1$ of the invention is shown in FIG. 5. The relay comprises an iterative detection and decoding unit DDU followed by a decision unit DU and by an encoding and transmission unit ETU.

The detection and decoding unit DDU periodically delivers to the unit DU an estimated version of the decoded messages from the sources. Joint decoding of the sequence transmitted by the other relay makes it easier to decode the messages from the sources. c. For each sub slot b, the decoding of the sequence from the other relay is configured on the basis of signalling information coming from that other relay indicating whether the relay is cooperating on this block b, $b=1, \ldots B$ and indicating the sources for which the relay is cooperating. Thus, for each block, the relay $R_1$ can determine which sources are represented in the sequence from the other relay, and can consequently direct the decoded sequence accordingly so that it is taken into account while decoding messages from the sources represented in the sequence.

The decision unit DU tests the CRCs of the estimated messages supplied by the DDU in order to determine which messages from the sources have been decoded without error, and it decides whether the relay is to transmit and what information it should transmit in each sub slot during the T time slots.

The encoding and transmission unit ETU transmits the payload signal to the destination during the cooperation stage of the relay. The information to be included in the signal is selected by the decision unit DU.

Figure 6:
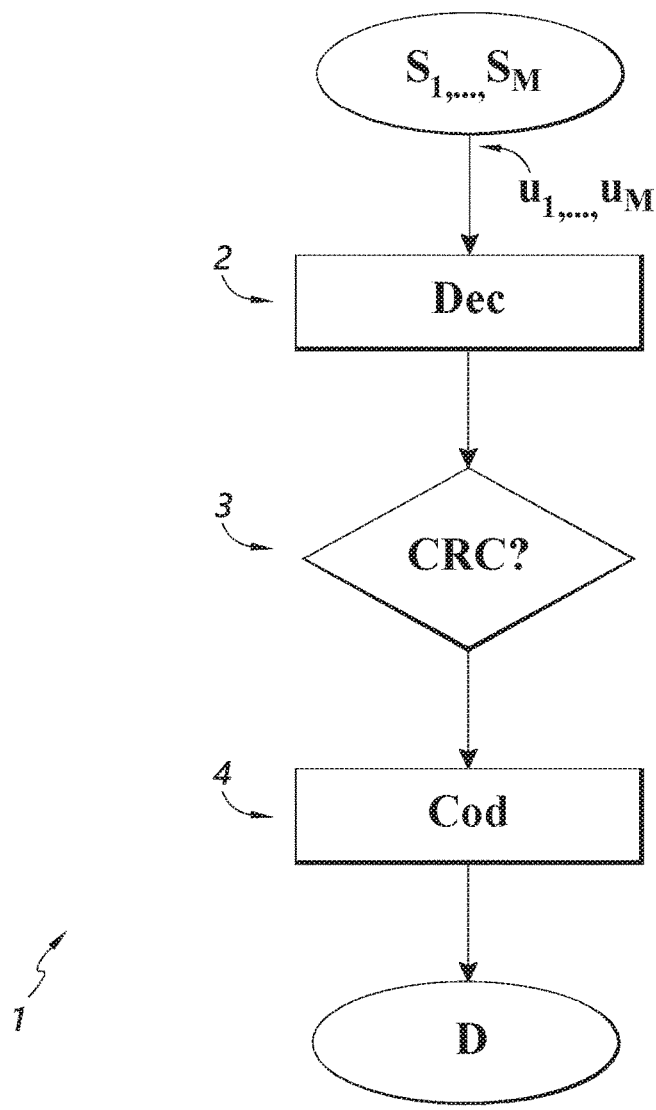
FIG. 6 is a flowchart of the method of the invention performed by the relay R.

A flowchart of the method performed by the relay $R_1$ is shown in FIG. 6. The method 1 comprises a decoding step 2, an error detection and decision step 3, and an encoding and transmission step 4 for sending a signal to the destination that is representative only of messages that have been decoded without error. The error detection and decision step controls encoding and transmission and feeds the encoding in compliance with a selection scheme after each received block. In an embodiment, the error detection and decision step also controls decoding.

The decoding step 2 is performed by the detection and decoding unit DDU of the relay. This detection and decoding step provides an estimate of the messages from the words received corresponding to the words $x_{S,t} = [x_{S,t}^{(1)}, x_{S,t}^{(2)}, \ldots, x_{S,t}^{(B)}]$ transmitted by each source S from among the M sources $\{S_1, S_2, \ldots, S_M\}$ and also an estimate of the decoded sequence corresponding to the signal transmitted by the other relay.

In an embodiment, the other relay, e.g. $R_2$ transmits over the same radio resource as is used by the sources, thereby maximizing the spectrum resource.

During each time slot $t \in \{1, \ldots, T\}$ and for each sub slot $b \in \{1, \ldots, B\}$, the relay $R_1$ receives:

$$y_{R_1,t}^{(b)} = \sum_{i=1}^{M} h_{S_i,R_1,t} x_{S_i,t}^{(b)} + h_{R_2,R_1,t} x_{R_2,t}^{(b)} 1_{\{J_{R_2,t}^b \neq \phi\}} + n_{R_1,t}^{(b)}$$

with and $h_{S_i,R_i,t}$ and $h_{R_2,R_i,t} \in C$ being the channel gain respectively between the source $S_i$ and the relay $R_1$, and between the relay $R_2$ and the relay $R_1$. $n_{R_i,t}^{(b)}$ is an additional noise vector of variance $\sigma^2$. And $1_{\{J_{R,t}^b = \phi\}}$ is a function indicating whether or not the relay $R_2$ is cooperating (is transmitting or is silent) during the block b:

$$1_{\{J_{R,t}^b \neq \phi\}} = \begin{cases} 1 & \text{if } J_{R,t}^b \neq \phi \\ 0 & \text{else} \end{cases},$$

with $\phi$ the empty set.

The detection and decoding unit DDU separates the received signal coming from the relay $R_2$ from the messages coming from the sources. This unit DDU is configured on each block by the signalling information coming from the relay $R_2$ indicating whether the relay is cooperating during this block and indicating the sources for which the relay is cooperating.

The relay $R_1$ may make use of a "sliding decoding window" by taking account of its particular time constraints:

1. concerning causality: the relay $R_1$ cannot make use of future transmissions from the relay and the sources.

2. concerning selection: the relay $R_1$ must provide an estimate of the signals of the messages decoded from the sources at the end of each block b.

The current instant (t,b) thus refers to the elapsed duration in terms of blocks for reaching the end of the sub slot b of the time slot t, i.e. $(t,b)=B(t-1)+b$.

The sliding window has a maximum length $Q_0B$ with $Q_0 \in \{1, \ldots, T\}$. The length of the sliding window varies as a function of the elapsed duration in terms of blocks for reaching $Q_0B$ when the elapsed duration becomes greater than $Q_0B$: if $t<Q_0$ then the sliding window for the current block b is of size $(t-1)B+b$ and reaches its maximum value tB for b=B; else $(t \geq Q_0)$ and the sliding window for the current block b is of size $(Q_0-1)B+b$ and reaches its maximum value $Q_0B$ for b=B.

When using a sliding window of length $(Q-1)B+b$, the relay begins at the end of each current sub slot $b \in \{1, \ldots, B\}$ for the current time slot $t \in \{1, \ldots, T\}$ in order to extract the QK information bits from each source as transmitted during the sub slots $$(t,b),(t,b-1), \ldots, (t,1),(t-1,B), \ldots, (t-1,1), \ldots, (t-(Q-1),1)$$

with the help of the messages from the relay $R_2$ transmitted during the slots $$(t,b),(t,b-1), \ldots, (t,1),(t-1,B), \ldots, (t-1,1), \ldots, (t-(Q-1),1).$$

Figures 1, 7:
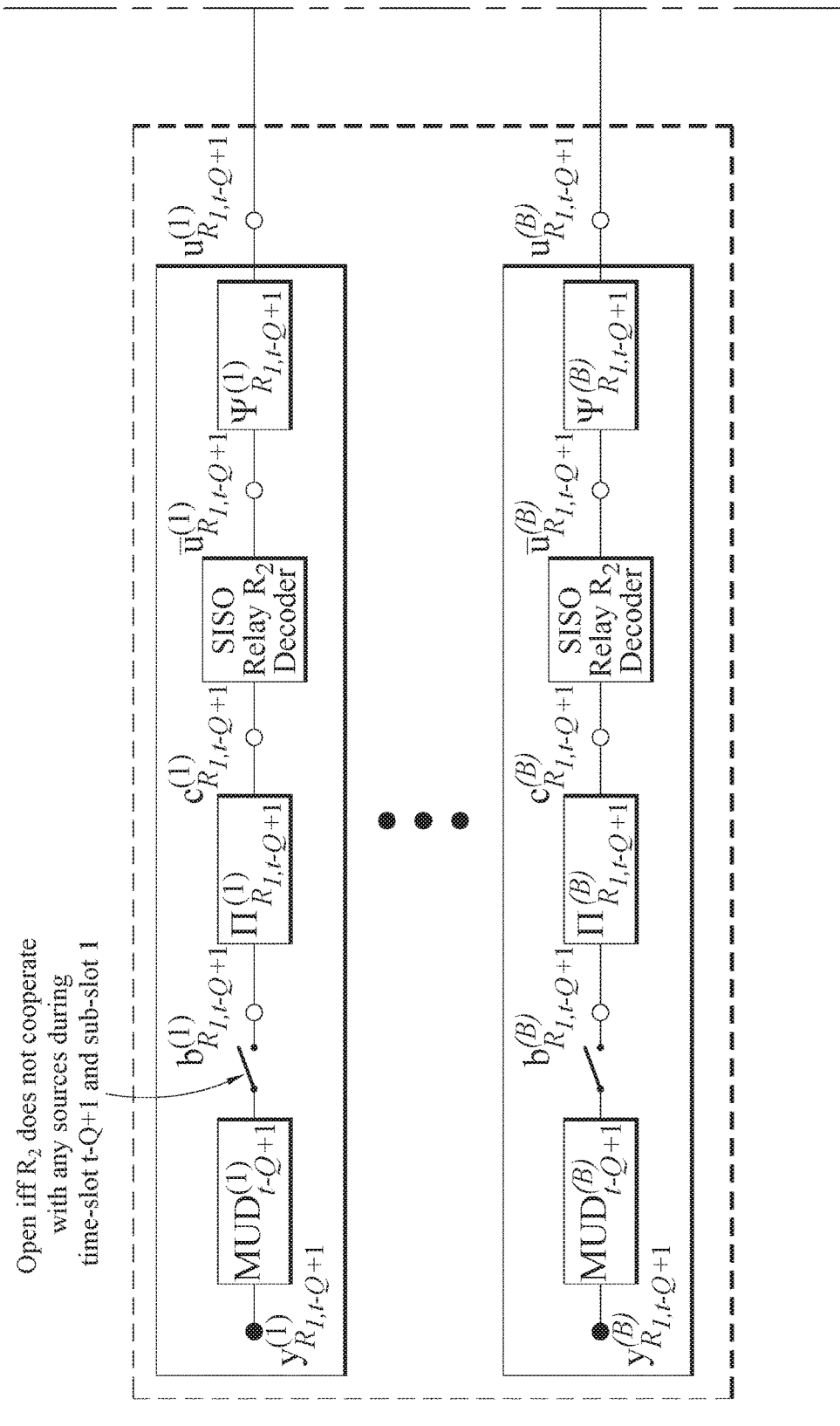
FIG. 7 is a diagram in the form of a factor graph showing a first embodiment of the detection and decoding unit DDU of a relay R of the invention.
Figures 2, 7:
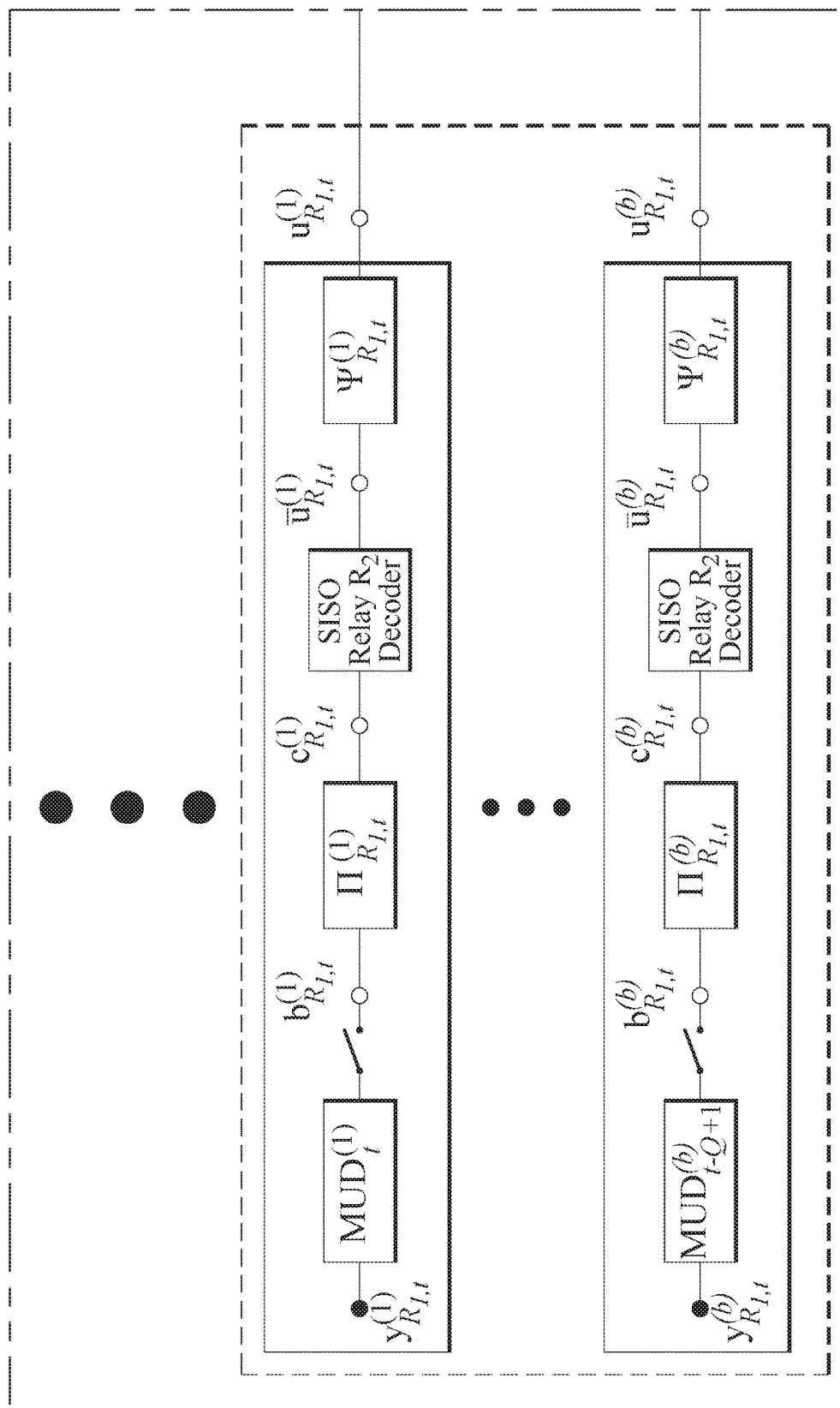
Figures 3, 7:
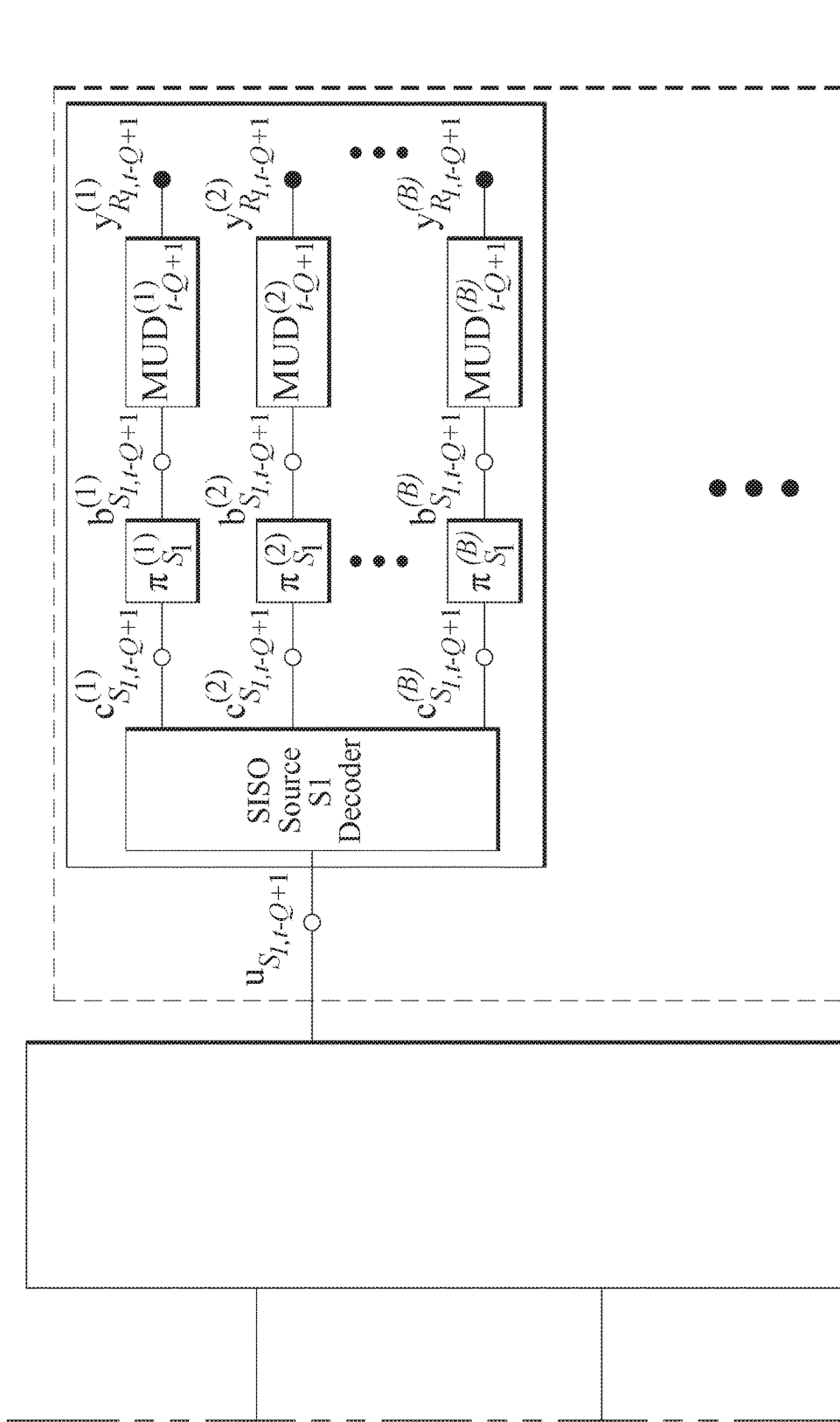
Figures 4, 7:
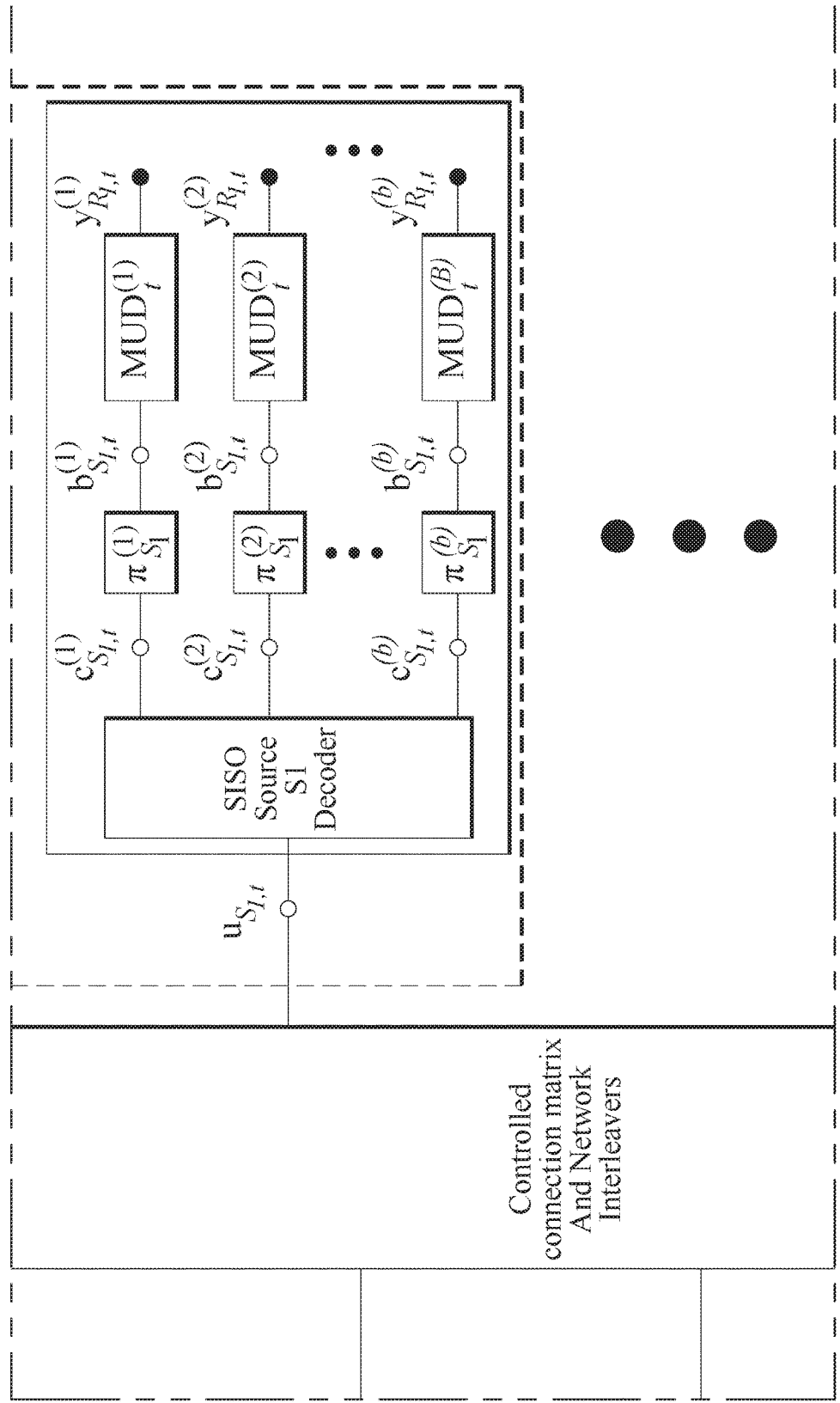
Figures 5, 7:
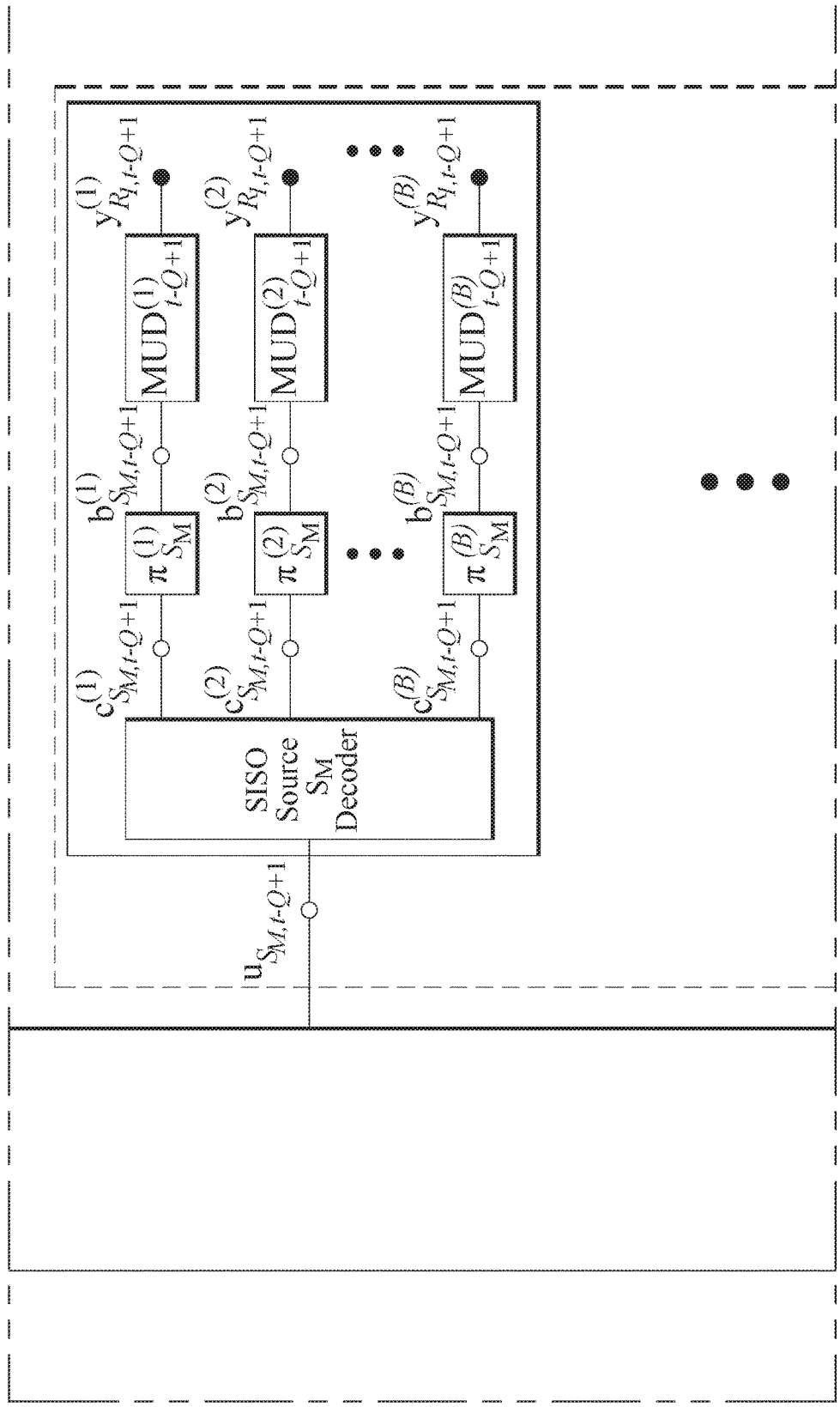
Figures 6, 7:
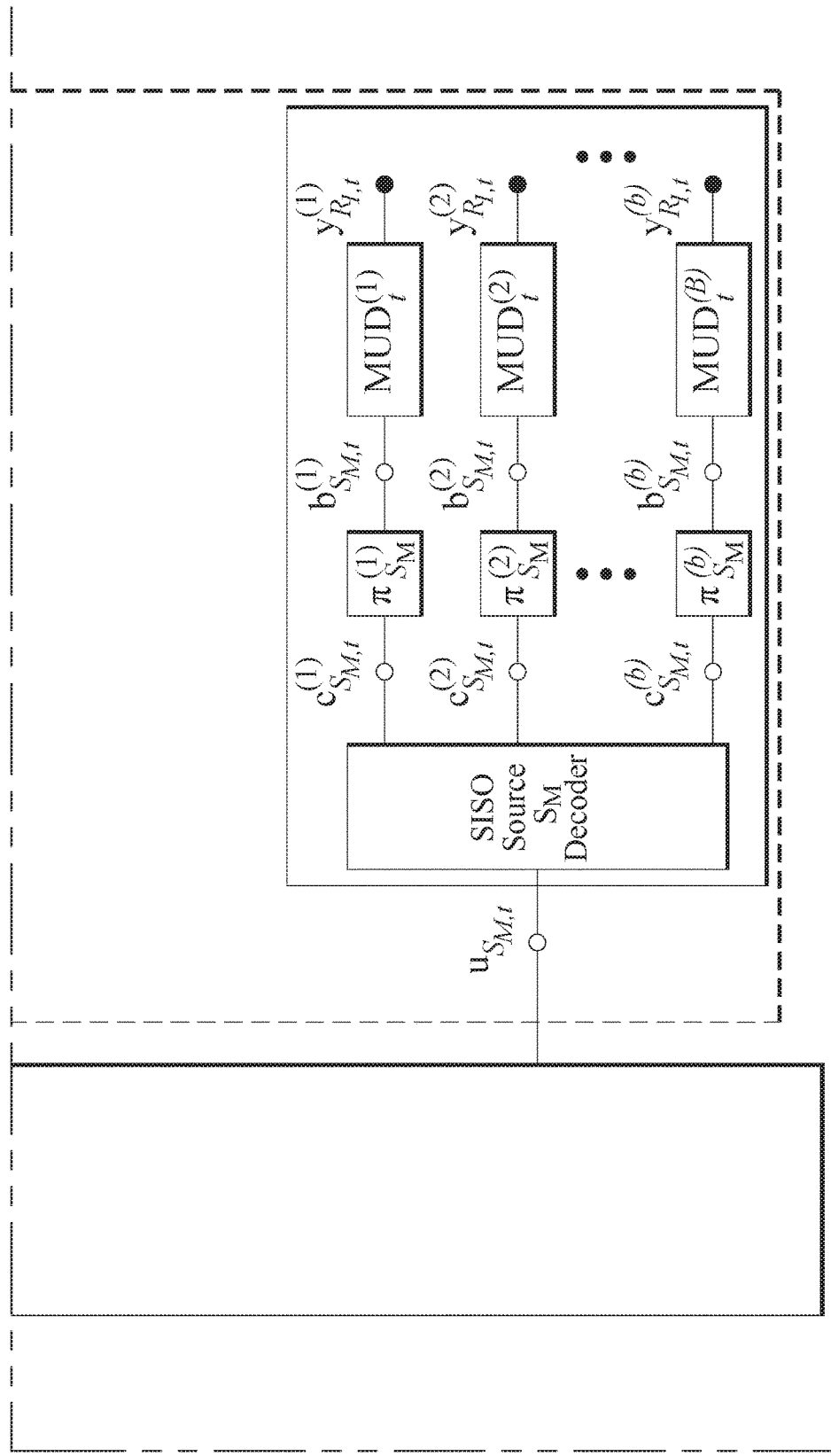

The structure of the detection and decoding unit DDU of the relay $R_1$ is shown by the diagram of FIG. 7 in the form of a factor graph during the sliding window Q that covers all of the sub slots from $(t-(Q-1),1)$ to $(t,b)$. The variable nodes are represented by circles and the constraint nodes by squares, with a constraint node being a function of the variable nodes that are attached thereto. Thus, for a source $S \in \{S_1, \ldots, S_M\}$, for a block $b \in \{1, \ldots, B\}$, the constraint node $\pi_S^{(b)}$ represents the constraint function $f(b_{S,t}^{(b)}, c_{S,t}^{(b)})$ that imposes that $b_{S,t}^{(b)}$ and $c_{S,t}^{(b)}$ are linked by the interleaver $\pi_S^{(b)}$, i.e., $b_{S,t}^{(b)} = \pi_S^{(b)} c_{S,t}^{(b)}$ or $c_{S,t}^{(b)} = [\pi_S^{(b)}]^{-1} b_{S,t}^{(b)}$. The so-called "sum product algorithm" (SPA) rules [1] serve to calculate the beliefs of a constraint node towards a variable node while taking account of the incident beliefs from the other variable nodes. In the logarithmic domain, beliefs (per bit) comprise extrinsic information in the form of extrinsic log likelihood ratios (LLRs).

The constraint node $MUD_t^{(b)}$ is linked to the variable nodes $b_{S_1,t}^{(b)}, \ldots, b_{S_M,t}^{(b)}, b_{R_2,t}^{(b)}$ and to the observation $y_{R_1,t}^{(b)}$, $b \in \{1, \ldots, B\}$. For reasons of clarity, we have duplicated the constraint node $MUD_t^{(b)}$ for each variable node. Nevertheless, a single activation of detecting multiple users associated with the constraint node $MUD_t^{(b)}$ makes it possible to generate the beliefs (or extrinsic LLRs) for sending to all of the associated variable nodes by taking account of the observation $y_{R_1,t}^{(b)}$ and the incident beliefs. A plurality of algorithms are possible for multiuser detection: the optimum Maximum A posteriori that makes use only of SPA rules in the log domain or of variants based on subtracting interference and linear filtering (often referred to as turbo-SIC or LMMSE-IC). The relay $R_1$ uses all of the blocks received during the sliding window of length Q, $Q \in \{1, \ldots, T\}$ and up to the current block b, $b \in \{1, 2, \ldots, B\}$ of the current interval t:

$$y_{R_1,t-Q+1}^{(1)}, \ldots, y_{R_1,t-Q+1}^{(B)}, \ldots, y_{R_1,t}^{(1)}, \ldots, y_{R_1,t}^{(b)}$$

for estimating the messages from each source $$\hat{u}_{S_1,t-Q+1}, \hat{u}_{S_2,t-Q+1}, \ldots, \hat{u}_{S_2,t}, \ldots, \hat{u}_{S_M,t}$$

The scheme shows the adaptive aspect of the multiuser detection and of the decoding as a function of the signalling transmitted by the relay $R_2$. Thus, for each block b of each time slot t, the detection and decoding system relating to the relay $R_2$ is or is not activated (represented by operating the switch) depending on whether or not the relay $R_2$ cooperates during this block b. The connection matrix is configured depending on the selection scheme used by the relay $R_2$ during the block b and transmitted by the signalling of the relay $R_2$.

In similar manner, the relay $R_2$ can benefit from the signal transmitted by the relay $R_1$ in order to help it decode the messages from the sources.

The detection and decoding unit DDU FIG. 7 may be operated as follows:

Step 2.1, all of the multiuser detectors MUD are activated as a function of the received signal:

$$y_{R_1,t-(Q-1)}^{(1)}, \ldots, y_{R_1,t-(Q-1)}^{(B)}, \ldots, y_{R_1,t}^{(1)}, \ldots, y_{R_1,t}^{(b)},$$

Step 2.2, the variable nodes representing the network coded messages coming from the relay receive the beliefs about their values by activating their interleavers and corresponding SISO modules.

Step 2.3, the variable nodes representing the messages from the sources received the beliefs about their values by activating firstly their interleavers and corresponding SISOs, and secondly the controlled connection matrix and network interleavers sub unit.

Step 2.4, on the basis of the beliefs received from the variable nodes of the messages from the sources, the destination verifies whether the messages have or have not been correctly decoded. If they have been correctly decoded, the destination stops decoding iterations on this sliding window. Otherwise, the method moves on to step 2.5.

Step 2.5, the variable nodes representing the network coded messages from the relay receive the beliefs about their values from the controlled connection matrix and network interleavers sub unit.

Step 2.6, the multiuser detectors MUD receive the beliefs about the bits forming the modulated signals $$y_{R_1,t-(Q-1)}^{(1)}, \ldots, y_{R_1,t-(Q-1)}^{(B)}, \ldots, y_{R_1,t}^{(1)}, \ldots, y_{R_1,t}^{(b)};$$

these being obtained as from activation of the interleavers and SISO units associated with the network coded messages and with the messages from the sources.

Steps 2.1 to 2.6 are repeated until reaching a maximum number of iterations or until leaving the loop during step 2.4.

It should be observed that a plurality of messages may be decoded without error from among the messages $$u_{S_1,t-Q+1}, u_{S_2,t-Q+1}, \ldots, u_{S_1,t}, \ldots, u_{S_M,t}$$

during a sliding decoding window performed at an earlier block or time slot. The decoding associated with the sliding window for the current block b of the current time slot t is thus simplified (by setting the beliefs associated with reliable values).

Step 3 of detecting messages that have been decoded without error and of the relay $R_1$ taking a decision is performed by the DU. During each time slot $t=1, \ldots, T$, step 3 detects errors in the estimated messages it $\hat{u}_{S_1,t}, \hat{u}_{S_2,t}, \ldots, \hat{u}_{S_M,t}$ at the end of each sub slot $b \in \{1, 2, \ldots, B\}$. In an implementation, error detection is performed by making use of CRC type information included in the first of the B blocks coming from the sources.

After each received block, encoding and transmission are controlled as follows:

1. In the absence of any message that has been decoded without error, the DU uses a selection scheme to decide which messages decoded during the preceding time slots need to be helped. For example, it is possible to help only the last message that has been decoded correctly, or by way of example it is possible to help any set of messages that have been decoded without error.

2. If some sources have been decoded without error, the unit allows help for these sources, i.e. it allows the ETU to encode and transmit for these sources.

3. If all of the sources are decoded without error, the DU causes the ETU to help all of the sources to the end of the current time slot, i.e. the error detection and decision step allows the messages from all of the sources to be encoded and transmitted up to the end of the current time slot. In an embodiment, the DU causes the DDU to stop processing the received signals, i.e. the error detection and decision step prevents decoding until the end of the current time slot.

The selection scheme is adapted as a function of the storage capacity of the relay $R_1$, as a function of the size of the sliding window when a sliding window is used by the destination, and as a function of the quantity of additional signalling needed for the destination. Among the various possible selection schemes, it is possible to distinguish the following two extreme schemes.

A first scheme in which help is allowed for any set of messages from any sources that have been correctly decoded during the preceding time slots (the messages that satisfy $\hat{u}_{S,i} = u_{S,i}$ for every $i=1, \ldots, t-1$ and for every source $\in \{S_1, \ldots, S_M\}$). This set is taken at the input to the network coding (at a given time slot and a given sub slot, the relayed information may be a function of any message transmitted by the sources).

A second scheme in which help may be given only to messages that have been decoded without error previously during the same time slot. Compared with the preceding scheme, this scheme requires a minimum of signalling. Storage size is small: at most MK bits. This scheme is compatible with decoding at the destination using a sliding decoding window that is of size Q=1.

Figure 8:
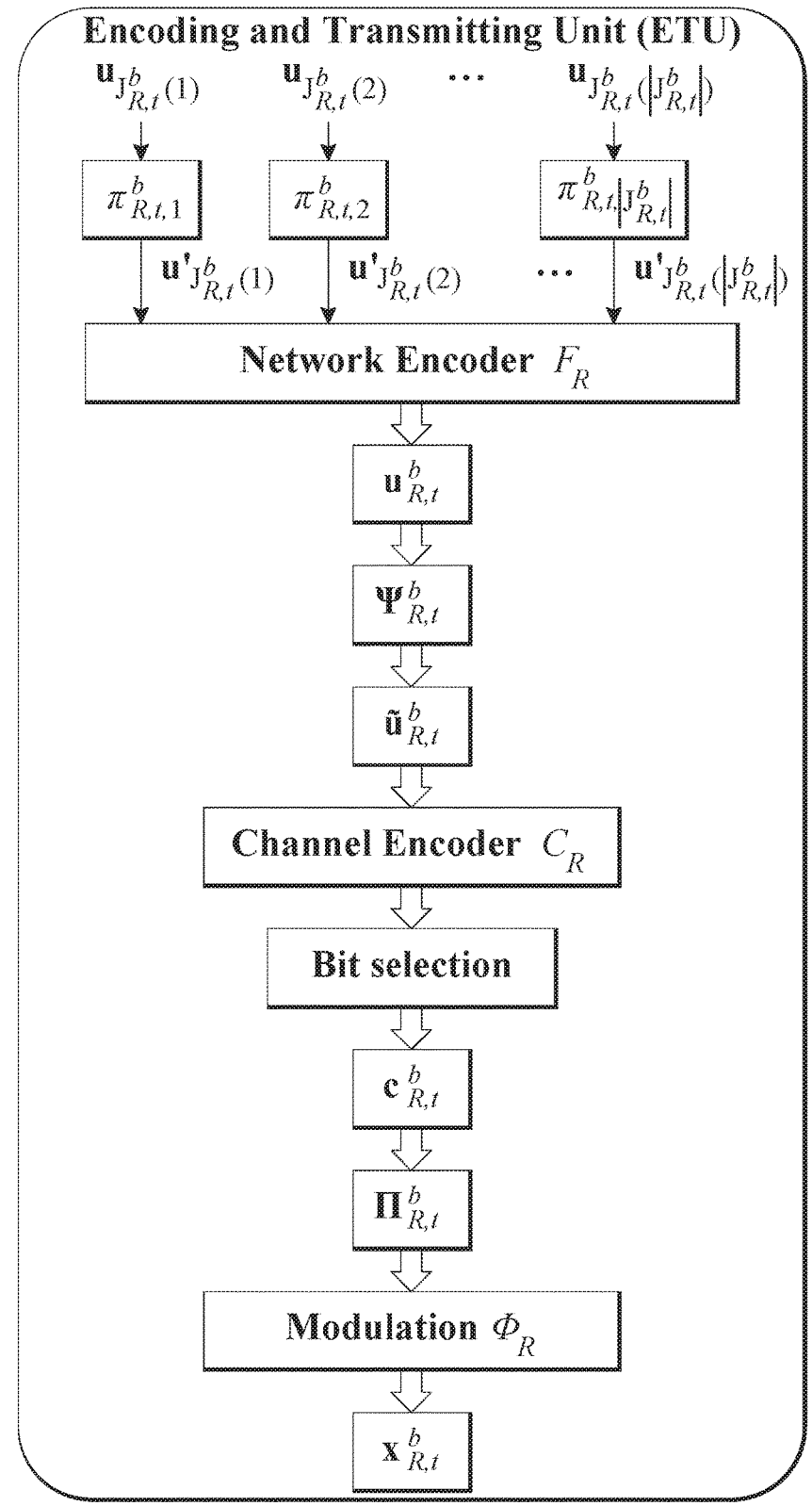
FIG. 8 is a diagram of an embodiment of the encoding and transmission unit (ETU) of a relay R of the invention.

Step 4 of encoding and transmission to the destination is performed by the encoding and transmission unit ETU shown in FIG. 8.

This encoding and transmission step encodes the messages that have been decoded without error in order to transmit a signal that is representative only of those messages that have been decoded without error. The relay encodes jointly only those messages that have been decoded without error and it adds its own redundancy so as to create a network code.

This encoding and transmission step is under the control of the error detection and decision taking step that optionally allows encoding and that selects the sources to which help is to be given.

Figure 9:
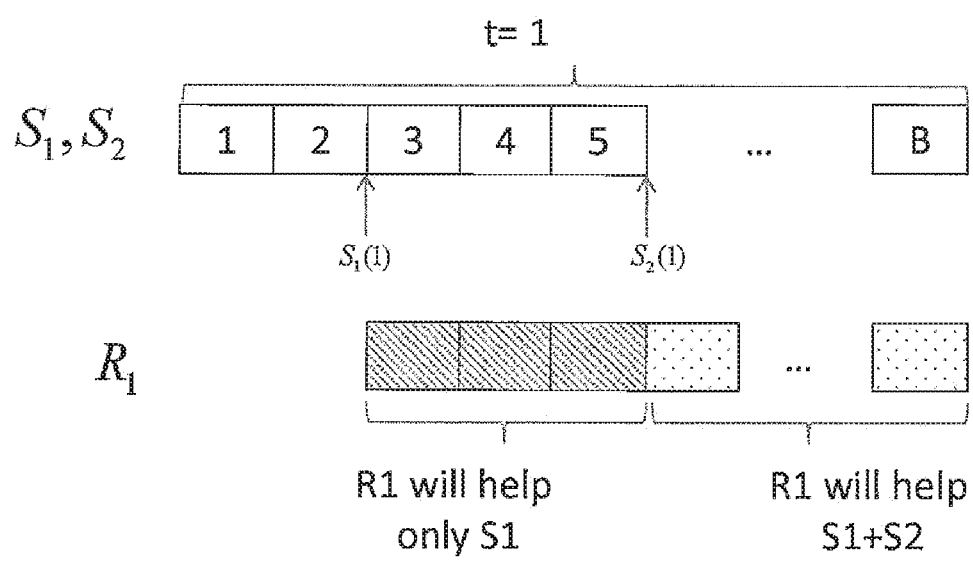
FIG. 9 shows an example of cooperation by the relay R of a MAMRC system having two sources $S_1$ and $S_2$ when there is only one time slot subdivided into B sub slots.

FIG. 9 shows the B sub slots of the first time slot. Each sub slot b corresponds to a data block b. FIG. 9 shows an example of selection when T=1. In this selection, the relay detects the source message $S_1$ without error at the end of the second sub slot and it detects the source message $S_2$ without error at the end of the fifth sub slot. Given that the relay is a full-duplex relay, it can provide help to the source $S_1$ during the sub slots b=3, 4, 5 (it thus being understood that it can transmit a representative signal) while simultaneously continuing to listen (i.e. to receive). At the end of the fifth sub slot, the relay stops listening since it has correctly decoded all of the messages from the sources and it provides help to both sources by transmitting a signal resulting from network coding of the messages from $S_1$ and $S_2$.

Figure 10:
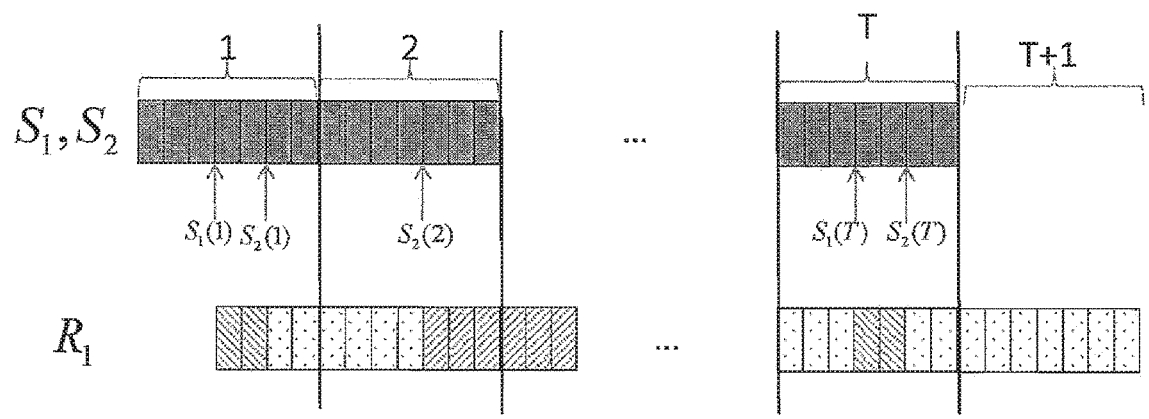
FIGS. 10 and 11 show examples of cooperation by the relay $R_1$ of a MAMRC system having two sources $S_1$ and $S_2$ during the time slots $t \in \{1, \ldots, T\}$, each being subdivided into B sub slots.
Figure 11:
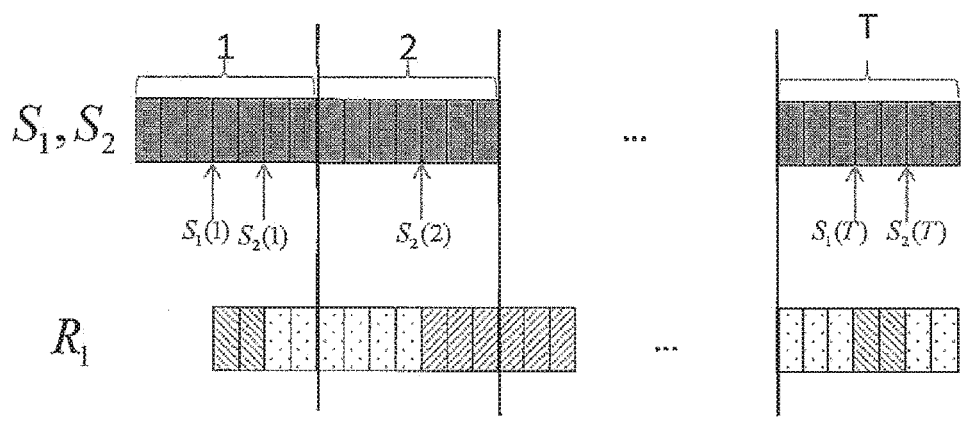

FIG. 10 shows an example of selection when $t=1, \ldots, T$. During the first time slot t=1, the relay is capable of decoding without error $S_1$ and then $S_2$ at the end of the sub slots 3 and 5 respectively. During the time slot t=2 the relay is capable of decoding without error the message from $S_2$ at the end of sub slot 4. Under such circumstances, during the sub slots 1, 2, 3, and 4 of the time slot t=2, the relay continues to provide help to the messages from $S_1$ and $S_2$ of the first time slot. As from sub slot 5 of time slot t=2, the relay begins to provide help for the message from $S_2$ of the second time slot until a new message is correctly decoded, and so on. The selection scheme of FIG. 11 is identical to the scheme of FIG. 10 except that the relay does not transmit any more after time slot t=T. Thus, the protocol of the invention makes it possible to save a time slot compared with the prior art by giving help immediately to the message that has been decoded without error, without waiting for the end of time slot t=T. The protocol is thus more efficient concerning channel occupancy and thus transmission capacity. But the relay cannot help a source if the source was decoded during the last sub slot of the time slot t=T.

FIG. 12 shows an example of cooperation between the relay $R_1$ and the relay $R_2$ in a MAMRC system having two sources $S_1$ and $S_2$, with the two relays listening to each other. During the first time slot t=1, the relay $R_1$ is capable of decoding without error $S_1$ and then $S_2$ at the end of the sub slots b=3 and b=5 respectively. During the time slot t=2 the relay $R_2$ is capable of decoding without error the messages from $S_1$ and from $S_2$ at the end of sub slot b=2. The relay $R_1$ benefits from the sequence transmitted by the relay $R_2$ and uses it in its own decoding of the sources. Thus, the relay $R_1$ is capable of decoding without error the message from $S_2$ at the end of the sub slot b=4. During the first timeslot t=1, the destination benefits from the sequences transmitted by the relay $R_1$ at the ends of the sub slots b=3 and b=5 thereby providing additional redundancy to the messages from $S_1$ and then from $S_2$. During the second timeslot t=2, the destination benefits from the sequence transmitted by the relay $R_2$ at the end of the sub slot b=2 that provides additional redundancy for the messages from $S_1$ and from $S_2$ and then benefits from the sequence transmitted by the relay $R_1$ at the end of the sub slot b=4 that provides additional redundancy for the message from $S_2$.

During each time slot $t \in \{1, \ldots, T\}$ and at the end of each sub slot $b \in \{1, \ldots, B\}$, as a general rule the unit DU orders the unit ETU to transmit a new signal generated from a new set $J_{R,t}^b$ of source messages that have been decoded without error during different time slots. At the input of the network encoder, the relay interleaves each message of this set $J_{R,t}^b$ by a distinct interleaver $\pi_{R,t,|J_{R,t}^b|}$ between the blocks b and between the messages of the set $J_{R,t}^b$.

There are several possible implementations of the network coding in the presence of multiple relays. For example, if the interleavers are distinct for each source decoded without error, the network coding may be merely an exclusive OR (XOR).

If the property of the full diversity character needs to be satisfied, which property, in the presence of source to relay links without error, ensures that all of the messages from the sources can be decoded without error in the event of N links being interrupted from among of the N+M links from the sources to the destination and from the relay to the destination, then it is necessary to use an algebraic code of the maximum distance separable (MDS) type in a finite Galois field of cardinal number greater than 2. Under such circumstances, the network encoder performs a combination $\Theta_R$ in a finite Galois field GF(q) of the messages decoded without error and interleaved with q>2 in order to recover diversity of order N+1, given that N≥1. This combination $\Theta_R$ provides joint coding of only those messages that have been decoded without error while adding its own redundancy, thereby creating a network code. By way of example, this linear combination may be a non-bijective surjective function $\Theta_R$ applied to the messages $u'_{J^b_{R_i,t}(|J^b_{R_i,t}|)}$ that have been decoded without error and interleaved.

Consideration is given to the relay $R_i$, $i \in \{1, \ldots, N\}$, the associated network encoding is the vector $a_i = [a_{1,i}\ a_{2,i}\ \cdots\ a_{M,i}]^T$ of dimension M. The vector $a_i$ is defined as being the $i^{th}$ column of the matrix T of dimension M×N, which defines the MDS encoder in systematic form $G = [I_M\ T]$ of dimension M×(N+M).

For a given configuration, assume that at the end of the sub slot b of the time slot t, this relay $R_1$ detects only J messages without error having indices contained in the set $J^b_{R_1,t} \subset \{1, \ldots M\}$, then the result of the network encoding $u^b_{R,t}$ is the linear combination $$u^b_{R,t} = \sum_{i \in J^b_{R_1,t}} a_{i,1} u'_{J^b_{R_1,t}(|J^b_{R_1,t}|)}.$$

This amounts to setting to zero the coefficients $$\{a_{i,1}\}_{i \notin J^b_{R_1,t}}$$

of the vector $a_1$ having indices that are not included in the set $J^b_{R_1,t}$.

In general manner, the function $\Theta_R$ is a surjection but it is not a bijection and over the messages decoded without error, and this function is referred to as the network encoding function for $|J_j| > 1$ where $|J_j|$ is the cardinal number of the set $J_j$. Specifically, at least two messages decoded without error must be available in order to be able to apply network encoding. When only one message is decoded without error, network encoding becomes an identity.

The output from the network code is a message having K information bits, written $J^b_{R,t} \in F_2^K$. The message $u^b_{R,t}$ is interleaved by an interleaver written $\Psi^b_{R,t}$. The interleaved message, written $\tilde{u}^b_{R,t}$ is converted by a channel encoder followed by a function for selecting bits in a sequence $c^b_{R,t} \in F_2^{n_R}$ from $n_R$ bits. The sequence $c^b_{R,t}$ is interleaved by a distinct interleaver written $\Pi^b_{R,t}$ and then modulated to obtain the complex sequence $x^b_{R,t} \in X^{N_b}$ in which $X \subset C$ represents a complex signal of cardinal number $|X| = 2^{q_R}$.

At the end of the time slots, the destination attempts to extract the messages from each source and from the relays.

The sequence received during time slot $t \in \{1, \ldots, T\}$ and during block $b \in \{1, 2, \ldots, B\}$ is as follows:

$$y^{(b)}_{D,t} = \sum_{i=1}^{M} h_{S_i,D,t} x^{(b)}_{S_i,t} + \sum_{i=1}^{N} h_{R_i,D,t} x^{(b)}_{R_i,t} 1_{\{J^b_{R_i,j} \neq \phi\}} + n^{(b)}_{D,t}$$

in which $h_{S_i,D,t} \in C$ represents the channel gain between the source $S_i$ and the destination D, $h_{R_i,D,t} \in C$ represents the channel gain between the relay $R_i$ and the destination D, $n^{(b)}_{D,t} \in C^{N_b}$ is a noise vector, and $$1_{\{J^b_{R_i,t} = \phi\}}$$

is an indicator to indicate whether or not the relay $R_i$ is silent:

$$1_{\{J^b_{R_i,t} \neq \phi\}} = \begin{cases} 1 & \text{if } J^b_{R_i,t} \neq \phi \\ 0 & \text{else} \end{cases}$$

where $\phi$ represents the empty set.

The destination may use "sliding window" decoding, or it may use "backward" decoding.

When using a sliding window of length Q, $Q \in \{1, \ldots, T\}$, the destination begins at the end of each time slot $t \in \{Q, \ldots, T\}$ to decode messages from the sources in order to extract the QK information bits from each source that are transmitted during the time slots t, t-1, ..., t-(Q-1) with help from the messages from the relays as transmitted during the time slots t, t-1, ..., t-(Q-1).

The size of the sliding window may be set at a maximum value, and the destination can decide on the optimum value on the basis of the signalling coming from the relays. For example, if the maximum size is three and if the destination knows that the relays do not give help to any source during the first time slot in the absence of messages that have been decoded without error, then the destination can begin to decode the first time slot immediately without waiting for three time slots.

The size of the sliding window at the destination can have an impact on the selection scheme of the relays. During a given time slot t, the selection scheme may be such that the relay does not give help to the messages that have been decoded without error in the time slots preceding the time slot t-(Q-1), i.e. the messages decoded during the time slots $\in \{1, \ldots, t-Q\}$.

FIG. 13 shows the structure of the decoder at the destination in the form of a factor graph during the sliding window Q that covers all of the time slots from t-(Q-1) to t. And for each time slot covered by the window, the systems for decoding sequences received from the relays are activated, e.g. by operating switches in order to make the systems active as a function of signalling information giving each sub slot, i.e. each block, an indication as to whether or not it has been transmitted by each relay. All of the blocks and sequences received during the window Q are decoded jointly. The controlled connection matrix and network interleavers sub unit makes connections between the variable nodes that represent the messages from the sources and the variable nodes that represent the sequences generated by the relays at each sub slot of each time slot. As input, this sub unit receives signalling information coming from the relays indicating for each sub slot the selection scheme used by each relay. The beliefs in the form of LLRs about the various variable nodes are exchanged within the factor graph until achieving convergence.

When implementing so-called "backward" decoding, the destination attempts to decode the messages from the sources at the end of time slot t=T, in order to extract the TK information bits from each source. This decoding scenario is appropriate when the T messages from a source form a frame (or super message), which means that there is no point in decoding one message before decoding the other messages. In contrast, when the messages from a source are independent, this scenario gives rise to pointless latency by necessarily waiting for the end of the time slot t=T. An example of the structure of the decoder is shown in FIG. 13. It is easy to obtain the "backward" decoding situation by setting t=T and Q=T. The constraint node $MUD^{(b)}_t$ is linked to the variable nodes $b^{(b)}_{S_1,t}, \ldots, b^{(b)}_{S_M,t}, b^{(b)}_{S_M,t}, \ldots, b^{(b)}_{R_N,t}$ and to the observation $y^{(b)}_{D,t}$. For reasons of clarity, we have duplicated the constraint node $MUD_t^{(b)}$ for each variable node. Nevertheless, a single activation of detecting multiple users associated with the constraint node $MUD_t^{(b)}$ makes it possible to generate the beliefs (or extrinsic LLRs) to all of the associated variable nodes by taking account of the observation $y_{D,t}^{(b)}$ and the incident beliefs.

The decoder of FIG. 13 may be run as follows.

Step 1, all of the multiuser detectors MUD are activated as a function of the received signal:

$$y_{D,t-(Q-1)}^{(1)}, \ldots, y_{D,t-(Q-1)}^{(B)}, \ldots, y_{D,t}^{(1)}, \ldots, y_{D,t}^{(B)}$$

Step 2, the variable nodes representing the network coded messages coming from the relays receive the beliefs about their values by activating their interleavers and corresponding SISO modules.

Step 3, the variable nodes representing the messages from the sources receive the beliefs about their values by activating firstly their interleavers and corresponding SISOs, and secondly the controlled connection matrix and network interleavers sub unit.

Step 4, on the basis of the beliefs received from the variable nodes of the messages from the sources, the destination verifies whether the messages $u_{S_1,t-(Q-1)}$, $u_{S_2,t-(Q-1)} \ldots, u_{S_M,t-(Q-1)}$ have or have not been correctly decoded. If they have been correctly decoded, the destination stops decoding iterations on this sliding window and slides the window to the following window (from t−(Q−1)+1 to t+1). Otherwise, the method moves on to step 5.

Step 5, the variable nodes representing the network coded messages from the relays receive the beliefs about their values from the controlled connection matrix and network interleavers sub unit.

Step 6, the multiuser detectors MUD receive the beliefs about the bits forming the modulated signals $$y_{D,t-(Q-1)}^{(1)}, \ldots, y_{D,t-(Q-1)}^{(B)}, \ldots, y_{D,t}^{(1)}, \ldots, y_{D,t}^{(B)}.$$

Steps 1 to 6 are repeated until reaching a maximum number of iterations or until leaving the loop during step 4.

It should be observed that a plurality of messages at time slots other than t−(Q−1) can be decoded without error. These are used for simplifying decoding for the next decoding windows.

The number of decoding windows used governs the complexity of the receiver, so in certain applications it is possible for priority to be given to only a few decoding windows.

By way of example, the sources are users who seek to transmit messages to a common destination, e.g. a base station of a mobile access network. The sources are helped by a plurality of relays, which may be cut-down base stations, and/or for example one of the sources, when that source lies on the path between the sources and the base station. A source may act as a relay, e.g. on a radio resource that it is not using for transmitting its own messages. The sources may equally well be base stations addressing the same destination.

In a particular use, the sources correspond to mobile terminals. In another use, the two sources may correspond to different services that are accessible from a single terminal, but under such circumstances the terminal is provided with at least two antennas that determine two different propagation channels between the terminal and the relays, and between the terminal and the destination.

APPENDIX

LLR: "Log Likelihood Ratio"
for U being a random binary variable, its log likelihood ratio (LLR) is defined by the following relationship:

$$LLR_u = \log\left(\frac{P_U(u=1)}{P_U(u=0)}\right)$$

in which relationship $P_U(u)$ denotes the probability that the random variable U takes the value u.

LAPPR: "Log A Posteriori Probability Ratio"
Represents to the LLR conditional on an observation that generally corresponds to a received signal.

$$LAPPR_u = \log\left(\frac{P(u=1 \mid y)}{P(u=0 \mid y)}\right)$$

[1] F. R. Kschischang, B. J. Frey, and H.-A. Loeliger, "Factor graphs and the sum-product algorithm," *IEEE Trans. Inform. Theory*, vol. IT-47, no. 2, pp. 498-519, February 2001.

The invention claimed is:

1. A relaying method performed by a full-duplex relay for a telecommunications system comprising a plurality of sources, the full-duplex relay and at least one other full-duplex relay, and a destination, the method comprising:
    a decoding process comprising estimating for each source code words $x_{S,t}$ from received blocks corresponding to successive code words $x_{S,t}$ transmitted simultaneously by the sources during T time slots, such that, at each time slot t, t=1, . . . , T, a code word $x_{S,t}$ comprises B blocks $x_{S,t}^{(1)}, x_{S,t}^{(2)}, \ldots, x_{S,t}^{(B)}$ of which the first can be decoded independently of the other blocks, a code word $x_{S,t}$ encoding a K-bit message $u_{S,t}$, where K, B, and T are natural integers, B>2, T>1;
    detecting, by the relay, messages that have been decoded without error and taking a decision; and
    encoding a signal and transmitting it to the destination, which signal is representative only of messages that have been decoded without error;
    such that, while estimating the messages from the sources, the relay takes account of a signal transmitted by the other relay representative of messages from sources that have been decoded without error by that other relay; and
    such that, after each received block, the encoding and transmission are performed under the control of the process of detecting messages that have been decoded without error and of taking a decision in compliance with a selection scheme, and in that the selection scheme is such that a representative signal relating to a message that has been decoded without error during a time slot is transmitted by the relay during the same time slot.

2. The method according to claim 1, further comprising storing messages that have been decoded without error.

3. The method according to claim 1, wherein in the absence of a message that has been decoded without error during a current time slot t, the error detection and decision taking process allows a message that has been decoded without error during a preceding time slot to be encoded and transmitted.

4. The method according to claim 1, wherein the decision taken allows a message to be encoded and transmitted as soon as it has been decoded without error.

5. The method according to claim 1, wherein after each received block, detection and decoding are under the control of the process of detecting messages that have been decoded without error and of taking a decision in compliance with a selection scheme.

6. The method according to claim 5, wherein if all the messages are decoded without error during a current time slot t, then the process of detecting messages that have been decoded without error and of taking decisions stops detection and decoding until the end of the current time slot and allows encoding and transmission.

7. The method according to claim 1, wherein the selection scheme is such that, at each current time slot t, the transmitted signal is representative of the messages decided without error up to the current time slot t.

8. The method according to claim 1, wherein the selection scheme is such that, during each current time slot t, the transmitted signal is representative of the messages that have been decoded without error solely during the current time slot t.

9. The method according to claim 1, wherein the encoding and transmission step includes interleaving for each source for which a message has been decoded without error prior to network coding.

10. The method according to claim 1, wherein the encoding and transmission process comprises network coding followed by first interleaving, by channel coding, and by second interleaving distinct from the first.

11. A full-duplex relay for a telecommunications system comprising a plurality of sources, the relay, at least one other relay, and a destination, the relay comprising:
a decoder configured to estimate for each source code words $x_{S,t}$ from received blocks corresponding to successive code words $x_{S,t}$ transmitted simultaneously by the sources during T time slots, such that, at each time slot t, t=1, . . . , T, a code word $x_{S,t}$ comprises B blocks $x_{S,t}^{(1)}$, $x_{S,t}^{(2)}$, . . . , $x_{S,t}^{(B)}$ of which the first can be decoded independently of the other blocks, with B and T natural integers, B>2, T>1;
a decision component configured to detect messages that have been decoded without error and for taking a decision; and
an encoder and transmitter configured to encode a signal and transmit it to the destination, which signal is representative only of messages that have been decoded without error;
which relay is configured such that, while estimating the messages from the sources, the decoder takes account of a signal transmitted by the other relay representative of messages from sources that have been decoded without error by that other relay; and
which relay is configured such that, after each received block the encoder and transmitter is under the control of the decision component which detects errors and and which takes a decision in compliance with a selection scheme, and which selection scheme is such that a representative signal relating to a message that has been decoded without error during a time slot is transmitted by the relay during the same time slot.

12. A reception method for a destination of a MAMRC system for performing a relaying method according to claim 1, the reception method comprising:
jointly detecting and decoding blocks coming from the sources and of messages coming from the relays, the detection and decoding being performed iteratively at the end of each time slot t such that t∈{1, . . . , t−Q−1} over the duration of a sliding window of length Q, Q∈{1, . . . , T}, with propagation of probabilities between the iterations in order to estimate Q messages for each source;
which decoding of the messages from the relays is configured in each sub slot on the basis of signalling information coming from the relays indicating whether each relay is cooperating on this block b, b=1, . . . B; and
which propagation of probabilities is configured for each block b, b=1, . . . B, on the basis of signalling information coming from each relay indicating the selection scheme of the relay, with B and T being natural integers, B>2, T>1.

13. A receiver for a MAMRC system, said receiver comprising:
a detector and decoder configured to jointly detect and decode blocks coming from sources and messages coming from relays, the detection and decoding being performed iteratively at the end of each time slot t such that t∈{1, . . . , t−Q−1} over the duration of a sliding window of length Q, Q∈{1, . . . , T}, with propagation of probabilities between the iterations in order to estimate Q messages for each source;
which receiver is configured such that the detector and decoder which detects and decodes messages from the relays is configured in each sub slot on the basis of signalling information coming from the relays indicating whether each relay is cooperating on this block b, b=1, . . . B; and
such that the propagation of probabilities is configured for each block b, b=1, . . . B, on the basis of signalling information coming from each relay indicating the selection scheme of the relay, with B and T being natural integers, B>2, T>1.

14. A method of transmitting a digital signal for a telecommunications system comprising a plurality of sources, at least two relays, and a destination implementing a spatially distributed network code, the method comprising for each source:
encoding messages $u_{S,t}$ including respective CRCs into code words $c_{s,t}$; and
transmitting the code words $c_{s,t}$ during T time slots to the relays and to the destination;
which encoding is of finite incremental redundancy type and, at each sub slot b=1, 2, . . . , B of a time slot, it delivers a block $c_{S,t}^{(b)}$ such that the B successive blocks $\{c_{S,t}^{(b)}: 1 \leq b \leq B\}$ form the code word $c_{s,t}$, such that the first block can be decoded independently of the other blocks, and such that the following blocks are parity bits that add redundancy to the first block.

15. A transmitter of a digital signal for a telecommunications system having a plurality of sources, at least two relays, and a destination implementing a spatially distributed network code, comprising:
an encoder which encodes messages $u_{S,t}$ having respective CRCs into code words $c_{s,t}$; and
which transmitter transmits code words $c_{s,t}$ during T time slots to the relays and to the destination;
which encoder is of finite incremental redundancy type and, at each sub slot b=1, 2, . . . , B of a time slot, it delivers a block $c_{S,t}^{(b)}$ such that the B successive blocks $\{c_{S,t}^{(b)}: 1 \leq b \leq B\}$ form the code word $c_{s,t}$, such that the first block can be decoded independently of the other blocks, and such that the following blocks are parity bits that add redundancy to the first block.

* * * * *